United States Patent
Trifu et al.

(10) Patent No.: US 12,381,221 B2
(45) Date of Patent: Aug. 5, 2025

(54) FIBROUS CARBON AEROGELS COATED WITH NANO-THIN SILICON AS LITHIUM BATTERY ANODES

(71) Applicant: Aspen Aerogels, Inc., Northborough, MA (US)

(72) Inventors: Roxana Trifu, Worcester, MA (US); Nicholas Leventis, Worcester, MA (US); Redouane Begag, Hudson, MA (US)

(73) Assignee: Aspen Aerogels, Inc., Northborough, MA (US)

( * ) Notice: Subject to any disclaimer, the term of this patent is extended or adjusted under 35 U.S.C. 154(b) by 740 days.

(21) Appl. No.: 17/560,624

(22) Filed: Dec. 23, 2021

(65) Prior Publication Data
US 2022/0209234 A1  Jun. 30, 2022

Related U.S. Application Data

(60) Provisional application No. 63/132,042, filed on Dec. 30, 2020.

(51) Int. Cl.
*H01M 4/583* (2010.01)
*H01M 4/04* (2006.01)
(Continued)

(52) U.S. Cl.
CPC ......... *H01M 4/583* (2013.01); *H01M 4/0416* (2013.01); *H01M 4/0471* (2013.01);
(Continued)

(58) Field of Classification Search
CPC .. H01M 4/583; H01M 4/0416; H01M 4/0471; H01M 4/366; H01M 4/48;
(Continued)

(56) References Cited

U.S. PATENT DOCUMENTS 4,474,662 A   10/1984  Makino et al.
4,606,955 A    8/1986  Eastman et al.
(Continued)

FOREIGN PATENT DOCUMENTS

CN   102277648 A   12/2011
CN   104241734 A   12/2014
(Continued)

OTHER PUBLICATIONS

Maedor et al—Polyimide Aerogels with Amide Cross-Links: A Low Cost Alternative for Mechanically Strong Polymer Aerogels ACS Appl. Mater. Interfaces 2015, 7, 2, 1240-1249 (Year: 2015).*

(Continued)

*Primary Examiner* — Michael L Dignan
(74) *Attorney, Agent, or Firm* — WOMBLE BOND DICKINSON (US) LLP; Deborah M. Vernon; Scott R. Breining

(57) ABSTRACT

The present disclosure is directed to silica-carbon composite materials including a low bulk density carbon material having a skeletal framework of carbon nanofibers, the skeletal framework forming a pore structure comprising an array of interconnected pores. The silica-carbon composite materials further include a conformal coating layer of silica on the carbon nanofibers. Further provided are methods for preparation of the silica-carbon composite materials, and methods for reduction of the silica-carbon composite materials to provide silicon-carbon composite materials.

19 Claims, 21 Drawing Sheets

(51) Int. Cl.
  *H01M 4/36* (2006.01)
  *H01M 4/48* (2010.01)
  *H01M 10/0525* (2010.01)
  *H01M 4/02* (2006.01)
(52) U.S. Cl.
  CPC .............. *H01M 4/366* (2013.01); *H01M 4/48* (2013.01); *H01M 10/0525* (2013.01); *H01M 2004/021* (2013.01)
(58) Field of Classification Search
  CPC ....... H01M 10/0525; H01M 2004/021; H01M 4/134; H01M 4/1395; H01M 4/386; H01M 4/625; H01M 4/62
  See application file for complete search history.

(56) References Cited

U.S. PATENT DOCUMENTS

| | | | |
|---|---|---|---|
| 4,610,863 | A | 9/1986 | Tewari et al. |
| 4,898,753 | A | 2/1990 | Inoue et al. |
| 4,997,804 | A | 3/1991 | Pekala |
| 5,231,162 | A | 7/1993 | Nagata |
| 5,234,966 | A | 8/1993 | Barringer et al. |
| 5,260,855 | A | 11/1993 | Kaschmitter et al. |
| 5,275,796 | A | 1/1994 | Tillotson et al. |
| 5,284,519 | A | 2/1994 | Gadgil |
| 5,358,802 | A | 10/1994 | Mayer et al. |
| 5,376,209 | A | 12/1994 | Stoakley et al. |
| 5,395,805 | A | 3/1995 | Droege et al. |
| 5,420,168 | A | 5/1995 | Mayer et al. |
| 5,476,878 | A | 12/1995 | Pekala |
| 5,502,156 | A | 3/1996 | St. Clair et al. |
| 5,520,960 | A | 5/1996 | Rancourt et al. |
| 5,565,142 | A | 10/1996 | Deshpande et al. |
| 5,575,955 | A | 11/1996 | Caplan et al. |
| 5,601,938 | A | 2/1997 | Mayer et al. |
| 5,626,977 | A | 5/1997 | Mayer et al. |
| 5,677,418 | A | 10/1997 | Thompson et al. |
| 5,859,171 | A | 1/1999 | Sawasaki et al. |
| 5,908,896 | A | 6/1999 | Mayer et al. |
| 5,962,539 | A | 10/1999 | Perrut et al. |
| 6,194,099 | B1 | 2/2001 | Gernov et al. |
| 6,315,971 | B1 | 11/2001 | Wallace et al. |
| 6,332,990 | B1 | 12/2001 | Mayer et al. |
| 6,399,669 | B1 | 6/2002 | Suzuki et al. |
| 6,451,965 | B1 | 9/2002 | Kanada et al. |
| 6,479,416 | B1 | 11/2002 | Frank et al. |
| 6,544,648 | B1 | 4/2003 | Nesbitt et al. |
| 6,586,081 | B1 | 7/2003 | Nishinaka et al. |
| 6,670,402 | B1 | 12/2003 | Lee et al. |
| 6,726,962 | B1 | 4/2004 | Loszewski |
| 7,071,287 | B2 | 7/2006 | Rhine et al. |
| 7,074,880 | B2 | 7/2006 | Rhine et al. |
| 7,256,147 | B2 * | 8/2007 | Yamada ................ C04B 35/524 438/483 |
| 7,811,711 | B2 | 10/2010 | Cooper et al. |
| 8,404,278 | B2 | 3/2013 | Albrecht et al. |
| 8,414,805 | B2 | 4/2013 | Wang |
| 8,999,202 | B2 | 4/2015 | Mulik et al. |
| 9,178,208 | B2 | 11/2015 | Park et al. |
| 9,745,198 | B2 | 8/2017 | Leventis et al. |
| 9,871,248 | B2 | 1/2018 | Rayner et al. |
| 2002/0094426 | A1 * | 7/2002 | Stepanian ............ B01J 13/0091 428/292.1 |
| 2004/0132845 | A1 | 7/2004 | Rhine et al. |
| 2006/0029857 | A1 | 2/2006 | Cherepy et al. |
| 2006/0084707 | A1 | 4/2006 | Ou et al. |
| 2006/0199455 | A1 | 9/2006 | Stepanian et al. |
| 2009/0053594 | A1 | 2/2009 | Johnson et al. |
| 2010/0310847 | A1 | 12/2010 | Suh et al. |
| 2011/0223494 | A1 | 9/2011 | Feaver et al. |
| 2012/0122652 | A1 * | 5/2012 | Worsley ................ H01M 4/52 977/948 |
| 2012/0141889 | A1 | 6/2012 | Lee et al. |
| 2012/0202112 | A1 | 8/2012 | Yushin et al. |
| 2012/0264020 | A1 | 10/2012 | Burton et al. |
| 2013/0040229 | A1 | 2/2013 | Grigorian et al. |
| 2013/0220974 | A1 | 8/2013 | Yushin |
| 2013/0224594 | A1 | 8/2013 | Yushin et al. |
| 2013/0344391 | A1 | 12/2013 | Yushin et al. |
| 2014/0170503 | A1 | 6/2014 | Yushin et al. |
| 2014/0272592 | A1 | 9/2014 | Thompkins et al. |
| 2014/0287641 | A1 | 9/2014 | Steiner, III |
| 2014/0308585 | A1 | 10/2014 | Han et al. |
| 2014/0315100 | A1 | 10/2014 | Wang et al. |
| 2015/0064568 | A1 | 3/2015 | Yushin et al. |
| 2015/0236372 | A1 | 8/2015 | Yushin et al. |
| 2015/0283534 | A1 | 10/2015 | Costantino et al. |
| 2015/0325882 | A1 | 11/2015 | Yushin et al. |
| 2015/0349346 | A1 | 12/2015 | Yushin et al. |
| 2016/0104882 | A1 | 4/2016 | Yushin et al. |
| 2016/0133394 | A1 | 5/2016 | Sakshaug et al. |
| 2016/0149278 | A1 | 5/2016 | Woehrle et al. |
| 2016/0240840 | A1 | 8/2016 | He et al. |
| 2016/0344030 | A1 | 11/2016 | Sakshaug et al. |
| 2017/0015559 | A1 | 1/2017 | Costantino et al. |
| 2017/0062219 | A1 | 3/2017 | Li et al. |
| 2017/0098823 | A1 | 4/2017 | Yushin et al. |
| 2017/0121483 | A1 | 5/2017 | Poe et al. |
| 2017/0170477 | A1 | 6/2017 | Sakshaug et al. |
| 2017/0170515 | A1 | 6/2017 | Yushin et al. |
| 2017/0233579 | A1 | 8/2017 | Yushin et al. |
| 2017/0355829 | A1 | 12/2017 | Sakaguchi et al. |
| 2018/0043656 | A1 | 2/2018 | Song et al. |
| 2018/0145328 | A1 | 5/2018 | Mullins et al. |
| 2018/0151884 | A1 | 5/2018 | Yushin et al. |
| 2018/0205111 | A1 | 7/2018 | Yushin et al. |
| 2018/0331356 | A1 | 11/2018 | Feaver et al. |
| 2019/0006672 | A1 | 1/2019 | Yushin et al. |
| 2019/0040497 | A1 | 2/2019 | Yushin et al. |
| 2019/0051892 | A1 | 2/2019 | Yushin et al. |
| 2019/0062517 | A1 * | 2/2019 | Steiner, III ............. C08J 9/28 |
| 2019/0081359 | A1 | 3/2019 | Yushin et al. |
| 2019/0081360 | A1 | 3/2019 | Yushin et al. |
| 2019/0123339 | A1 | 4/2019 | Yushin et al. |
| 2019/0148803 | A1 | 5/2019 | Lee et al. |
| 2019/0198837 | A1 | 6/2019 | Yushin et al. |
| 2019/0259546 | A1 | 8/2019 | Kron et al. |
| 2019/0326589 | A1 | 10/2019 | Ho et al. |
| 2020/0024796 | A1 | 1/2020 | Yushin et al. |
| 2020/0083542 | A1 | 3/2020 | Yushin et al. |
| 2020/0091517 | A1 | 3/2020 | Yushin et al. |
| 2020/0235420 | A1 | 7/2020 | Yushin et al. |

FOREIGN PATENT DOCUMENTS

| | | |
|---|---|---|
| CN | 106207142 A | 12/2016 |
| CN | 108727818 A | 11/2018 |
| CN | 112271301 A | 1/2021 |
| CN | 112323510 A | 2/2021 |
| DE | 102015207552 A1 | 10/2016 |
| EP | 0987294 A1 | 3/2000 |
| EP | 1205512 A1 | 5/2002 |
| EP | 3480507 A1 | 5/2019 |
| WO | 2002052086 A2 | 7/2002 |
| WO | 2004009673 A1 | 1/2004 |
| WO | 2013065897 A1 | 5/2013 |
| WO | 2016127904 A1 | 8/2016 |
| WO | 2018095283 A1 | 5/2018 |
| WO | 2018095285 A1 | 5/2018 |
| WO | 2018200827 A1 | 11/2018 |

OTHER PUBLICATIONS

Bao et al—Chemical reduction of three-dimensional silica microassemblies into microporous silicon replicas. Nature Letters, 2004 (Year: 2004).*
Liu et al—Rice husks as a sustainable source of nanostructured silicon for high performance Li-ion battery anodes, Scientific Reports, 2013. (Year: 2013).*
Gorgolis et al, Graphene aerogels: a review, 2017 2D Mater. (Year: 2017).*

(56) References Cited

OTHER PUBLICATIONS

Singh et al, Sol-Gel processing of silica nanoparticles and their applications, Advances in Colloid and Interface Science, 2014 (Year: 2014).*
Wang et al—Nanostructured Si—C composite anodes for lithium-ion batteries, Electrochemistry Communications, 2004. (Year: 2004).*
Product spec sheet for Mg powder (Year: 2024).*
Lopez et al., Tough ceramic coatings: Carbon nanotube reinforced silica sol-gel, 2010, Applied Surface Science (Year: 2010).*
Machine English translation of CN 108727818 (Year: 2018).*
Al-Kandary et al. "New polyimide-silica nano-composites from the sol-gel process using organically modified silica network structure." J. Mater. Sci. 41 (2006) 2907-2914 (Year: 2006).*
Akhter et al. "Synthesis and characterization of novel coatable polyimid-silica nanocomposites." J Polym Res (2014) 21:332 (Year: 2014).*
Bekyarova et al. "Structure and Physical Properties of Tailor-Made Ce, Zr-Doped Carbon Aerogels. " Adv. Mater. 12.21 (2000): 1625-1628.
Biesmans et al. "Polyurethane based organic aerogels and their transformation into carbon aerogels". J. Non-Crystalline Solids. 225(1998): 64-68.
Bock et al. "Influence of Monomer and Catalyst Concentration on RF and Carbon Aerogel Structure." J. Non-Crystalline Solids. 225(1998): 69-73.
Chidambareswarapattar et al. "One-step room-temperature synthesis of fibrous polyimide aerogels from anhydrides and isocyanates and conversion to isomorphic carbons" J. Mater. Chem. 20(2010): 9666-9678.
Dai et al. "Metal-organic framework-templated synthesis of sulfur-doped core-sheath nanoarrays and nanoporous carbon for flexible all-solid-state asymmetric supercapacitors." Nanoscale. 10(2018): 15454-15461.
Frackowiak et al. "Carbon materials for the electrochemical storage of energy in capacitors." Carbon. 39(2001): 937-950.
Gash et al. "New Sol-gel Synthetic Route to Transition and Main-group Metal Oxide Aerogels Using Inorganic Salt Precursors." J. Non-Crystalline Solids. 285(2001): 22-28.
Glora et al. "Integration of Carbon Aerogels in PEM Fuel Cells." J. Mon-Cryst. Solids. 285(2001): 283-287.
Guo et al. "Polyimide Aerogels Cross-Linked through Amine Functionalized Polyoligomeric Silsesquioxane." ACS Appl. Mater. Interfaces. 3(2011): 546-552.
Hanzawa et al. "Activated carbon aerogels." Langmuir. 12.6(1996): 6167-6169.
Hutagalung et al. "Optical and Electrical Characteristics of Silicon Nanowires Prepared by Electroless Etching." Nanoscle Res. Lett. 12(2017): 425.
International Search Report and Written Opinion issued in International Patent Application No. PCT/US2020/020148 dated May 27, 2020.
International Search Report and Written Opinion issued in International Patent Application No. PCT/US2020/020148 dated Sep. 3, 2020.
International Search Report and Written Opinion issued in International Patent Application No. PCT/US2020/024086 dated Oct. 1, 2020.
International Search Report and Written Opinion issued in International Patent Application No. PCT/US2020/24113 dated Jun. 18, 2020.
Kistler. "Coherent Expanded Aerogels." J. Phys Chem. 36.1(1932): 52-64.
Leventis et al. "Isocyanate-Derived Organic Aerogels: Polyureas, Polyimides, Polyamides." Mater. Res. Soc. Symp. Proc. 1306(2011).
Leventis et al. "Polyimide Aerogels by Ring-Opening Metathesis Polymerization (ROMP)." Chem. Mater. 23.8(2011): 2250-2261.
Li et al. "Novel approach toward a binder-free and current collector-free anode configuration: highly flexible hanoporous carbon nanotube electrodes with strong mechanical strength harvesting improved lithium storage." J. Mater Chem. 22.36(2012): 18847-18853.
Maldonado-Hodar et al. "Synthesis and textural characteristics of organic aerogels, transition-metal-containing organic aerogels and their carbonized derivatives." Carbon. 37(1999): 1199-1205.
Meador et al. "Mechanically Strong, Flexible Polyimide Aerogels Cross-Linked with Aromatic Triamine." ACS Appl. Mater. Interfaces (2012) ..
Meador et al. "Polyimide Aerogels with Amide Cross-Links: A Low Cost Alternative for Mechanically Strong Polymer Aerogels." ACS Appl. Mater. Interfaces. 57(2015): 1240-1249.
Miller at al. "Morphology and electrochemistry of ruthenium/ carbon aerogel nanostructures." Langmuir. 15(1999): 799-806.
Nguyen et al. "Development of High Temperature, Flexible Polyimide Aerogels." ACS. (2011).
Pei et al. "Preparation and Characterization of Highly Cross-Linked Polyimide Aerogels Based on Polyimide Containing Trimethoxysilane Side Groups." Langmuir. 30(2014): 13375-13383.
Pekala et al. "Carbon Aerogels for Electrochemical Applications." J. Non-Crystalline Solids. 225(1998): 74-80.
Petricevic et al. "Planar fiber reinforced carbon aerogels for applications in PEM fuel cells." Carbon. 39(2001): 857-867.
Saliger et al. "High surface area carbon aerogels for supercapacitors." J. Non-Crystalline Solids. 225(1998): 81-85.
Singh et al. "Sulfur-Doped Laser-Induced Porous Graphena Derived from Polysulfone-Class Polymers and Membranes." ACS Nano. 12(2017): 289-297.
Wang et al. "A dual pore carbon aerogel based air cathode for a highly rechargeable lithium-air battery." J. Power Sources. 272(2014): 1061-1071.
Wang et al. "Carbon cloth reinforced carbon aerogel films derived from resorcinol formaldehyde." J. Porous Mater. 8 (2001): 159-165.
Wang et al. "Electrical Transport Properties of Carbon Aerogels." J. Porous Mater. 8(2001): 167-170.
Wang et al. "Nanostructured Si—C composite anodes for lithium-ion batteries." Electrochem. Comm. 6.7(2004): 689-692.
Ye et al. "A New Electrocatalyst Consisting of a Molecularly Homogeneous Platinum-Aerogel Nanocomposite." Can. J. Chem. 75(1997): 1666-1673.
Ye et al. "A new fuel cell electrocatalyst based on carbonized polyacrylonitrile foam", J. Electrochem. Soc., 144, [1], (1997) 90.
Zhang et al., Graphene/carbon aerogels derived from graphene crosslinked polyimide as electrode materials for supercapacitors, RSC Adv., 2015, 5, 1301.
Zuo et al. "Polymer/Carbon-Based Hybrid Aerogels: Preparation, Properties and Applications." Mater. 8.10(2015): 6806-6848.
Chen et al., "Confined Synthesis and Properties of Porous Silicon from Silica Aerogel Templates by Magnesiothermic Reduction", Acta Phys.—Chim vol. 27, No. 11, 2011, pp. 2719-2725.
Chen et al., "Mesoporous Silicon Anodes Prepared by Magnesiothermic Reduction for Lithium Ion Batteries", Journal of the Electrochemical Society, vol. 158, No. 9, pp. A1055-A1059.
Entwistle et al., "A review of magnesiothermic reduction of silica to porous silicon for lithium-ion battery applications and beyond", Journal of Materials Chemistry, vol. 6, 2018, pp. 18344-18356.
Kim et al., "Complete magnesiothermic reduction reaction of vertically aligned mesoporous silica channels to form pure silicon nanoparticles", Scientific Reports, vol. 5, Article No. 9014, 2015.
Zuo et al., "Self-Templating Construction of 3D Hierarchical Macro-/ Mesoporous Silicon from 0D Silica Nanoparticles", ACS Nano, vol. 11, No. 1, 2017, pp. 889-899.
Farneth et al. "Encapsulated laccase electrodes for fuel cell cathodes." J. Electroanal. Chem. and Interfacial Electrochemistry, 581(2005): 197-205.
International Search Report and Written Opinion issued in International Patent Application No. PCT/IB2021/062280 date Mar. 15, 2022.
Martinez-Rodriguez et al. "Effect of microporous layer on MacMullin No. of carbon paper gas diffusion layer." J. Power Sources. 207(2012): 91-100.

* cited by examiner

FIBROUS CARBON AEROGELS COATED WITH NANO-THIN SILICON AS LITHIUM BATTERY ANODES

CROSS REFERENCES TO RELATED APPLICATIONS

This application claims priority to and the benefit of U.S. Provisional Patent Application No. 63/132,042, filed Dec. 30, 2020, which application is hereby incorporated by reference in its entirety, with any definitions of terms in the present application controlling.

TECHNICAL FIELD

The present disclosure relates generally to nanoporous carbon-based materials including a nano-thin coating of silica or silicon and processes for making the same. Such materials are suitable for use in environments containing electrochemical reactions, for example, as electrode materials within a lithium-ion battery.

BACKGROUND

Lithium-ion batteries (LIBs) have seen widespread use in a variety of applications, from handheld electronics to automobiles. They are a type of rechargeable battery in which lithium ions travel from an anode to a cathode during discharge and from the cathode to the anode during charge. Conventionally, the cathode of LIBs is formed of mixed metal oxides of lithium and, e.g., cobalt, nickel, manganese, while the anode is formed of graphite, where lithium ions intercalate within graphite layers during charge (energy storage). Graphite is widely used because lithium intercalation is higher with graphite than other known carbons. Nevertheless, there is a demand for lithium ion battery anode materials that command even higher levels of lithium intercalation than what is obtained with graphite.

Silicon (Si) has a high charge storage capacity and a greater affinity for lithium compared to graphite (carbon), making it desirable for LIB anodes. Accordingly, there is a desire to dispose as much silicon as possible within the anode. Two issues, however, serve as impediments to broadscale adoption of Si as an anode material. These issues are: (a) the parasitic weight of graphite that is needed in an anode in order to keep good electrical contact (minimum electrical resistance) with the Si through charging and discharging; and (b) the volume expansion of Si during charging, which may be about four-fold. The parasitic weight of graphite reduces the charge storage capacity of both the anode and the battery as a whole, while the volume expansion may have catastrophic results, both at the local level of the anode (e.g., loss of electrical contact with Si) and at the battery level due to the outward "pushing" effect of the expanding Si which may cause rupture of the battery, exposing lithium to the environment and creating a fire hazard.

Accordingly, it would be desirable in the art to provide Si-containing anode materials which maintain low electrical resistance and accommodate Si expansion.

SUMMARY

The present technology is generally directed to nanoporous carbon-based materials including a nano-thin coating of silica or silicon. Specifically, the technology is directed to composite material comprising carbon material of low envelope density, the carbon material comprising a skeletal framework comprising carbon nanofibers, the skeletal framework forming a pore structure comprising an array of interconnected pores, wherein the carbon nanofibers are plated at the nanostructured level with a layer of nano-thin silica or silicon. The technology is further generally directed to methods for preparing such materials. The methods generally comprise forming a conformal silica ($SiO_2$) coating on a carbon aerogel material, or forming a conformal silica coating on a polyimide aerogel material and pyrolyzing the silica-coated polyimide aerogel to form a silica-coated carbon aerogel. Preparative methods are disclosed herein for conversion of silica-carbon composite materials to silicon-carbon composite materials by metallothermically reducing silica.

Surprisingly, according to the present disclosure, it was found that when carbon aerogel materials were impregnated with a silica sol, the silica sol allowed to gel within the pores of the carbon aerogel, and the solvent removed by drying, the resulting silica present within the carbon aerogel did not have the usual randomly distributed three-dimensional nano-particulate structure of bulk silica. Instead, the silica formed a conformal, nanometer-scale thick coating of silica on the fibers of the carbon aerogel material. After pyrolyzing the silica-coated polyimide aerogel materials, carbon aerogel materials were obtained in which the morphology of the silica coating was maintained. The physical properties and appearance under scanning electron microscopy of the silica-coated carbon aerogel materials so obtained were essentially the same as the silica-coated carbon aerogel materials obtained by direct impregnation of carbon aerogels with silica.

Further, according to the present disclosure, it was found that silica aerogel materials, when subject to magnesiothermic reduction, resulted in aerogel materials in which a significant portion of the silica had been reduced to elemental silicon. The resulting silicon material maintained the silica morphology. Advantageously, nanoporous carbon-based aerogel materials having a nano-thin silicon coating as disclosed herein may simultaneously address prior recognized issues with silicon-based battery anodes by e.g., allowing the silicon to swell without fracturing, providing volume for silicon expansion, and maintaining electrical contact of silicon with the nanoporous carbon framework. Porous structures with thin walls and silicon substructures, such as the disclosed silicon-carbon composite materials, may shorten the diffusion length of lithium ions within silicon in lithium ion batteries (LIBs). In addition, porous silicon with a high surface area can increase the accessibility of an electrolyte to silicon surfaces, shortening lithium diffusion lengths and increasing available capacity at higher rates in LIBs.

Accordingly, in one aspect is provided a silica-carbon composite material comprising carbon material of low bulk density, the carbon material comprising a skeletal framework comprising carbon nanofibers, the skeletal framework forming a pore structure comprising an array of interconnected pores, the silica-carbon composite material further comprising a conformal coating layer of silica on the carbon nanofibers.

In some embodiments, the conformal coating layer of silica has a thickness from about 1 to about 20 nm. In some embodiments, the conformal coating layer of silica consists of silica particles. In some embodiments, the conformal coating layer of silica is porous. In some embodiments, the conformal coating layer of silica is a silica aerogel. In some embodiments, the conformal coating layer of silica is a silica xerogel. In some embodiments, the silica is amorphous.

In some embodiments, substantially no silica is present within the pores, beyond any silica extending into said pores from the conformal coating layer.

In some embodiments, the silica-carbon composite material is in monolithic form, in the form of thin sheets, or in particulate form. In some embodiments, the silica-carbon composite material is in particulate form, the particles having a diameter or largest dimension from about 100 nm to about 4 mm, or from about 5 µm to about 4 mm.

In another aspect is provided a method of preparing a silica-carbon composite material comprising carbon material of low bulk density, the carbon material comprising a skeletal framework comprising carbon nanofibers, the skeletal framework forming a pore structure comprising an array of interconnected pores, the silica-carbon composite material further comprising a conformal coating layer of silica on the carbon nanofibers, the method comprising: providing a carbon material of low envelope density comprising a skeletal framework comprising carbon nanofibers; and coating the carbon nanofibers with silica to form the conformal coating layer of silica.

In some embodiments, coating the carbon nanofibers with silica comprises: impregnating pores of the carbon material with a silica sol; and allowing the silica sol to gel, spontaneously forming the conformal coating layer of silica on the carbon nanofibers.

In some embodiments, the silica is amorphous.

In some embodiments, the method further comprises drying the conformal coating layer of silica under ambient or supercritical conditions, forming a conformal silica xerogel or aerogel coating layer, respectively.

In a further aspect is provided a method of preparing a silica-carbon composite material comprising carbon material of low bulk density, the carbon material comprising a skeletal framework comprising carbon nanofibers, the skeletal framework forming a pore structure comprising an array of interconnected pores, the silica-carbon composite material further comprising a conformal coating layer of silica on the carbon nanofibers, the method comprising:

providing a fibrous polyimide aerogel;
impregnating the fibrous polyimide aerogel with a silica sol;
allowing the silica sol to gel, spontaneously forming the conformal coating layer of silica on the polyimide aerogel fibers;
drying the silica coated polyimide aerogel under ambient or supercritical conditions to form a silica aerogel coating layer on the polyimide aerogel fibers; and
pyrolyzing the silica aerogel coated polyimide aerogel to form the silica-carbon composite material.

In some embodiments, the silica sol comprises tetraethyl orthosilicate, tetramethyl orthosilicate, methyl triethoxysilane, sodium silicate, pre-hydrolyzed pre-polymers of ethyl polysilicate, methyl polysilicate, polydimethylsiloxane, or combinations thereof. In some embodiments, the silica sol comprises tetraethyl orthosilicate, tetramethyl orthosilicate, methyl triethoxysilane, polydimethylsiloxane, or a combination thereof.

In some embodiments, the silica-carbon composite material comprises silica in an amount by weight from about 30 to about 80%, or from about 40 to about 70%.

In some embodiments, the conformal coating layer of silica has a thickness from about 1 to about 20 nm.

In some embodiments, the silica is amorphous.

In some embodiments, the silica-carbon composite material is in monolithic form, in the form of thin sheets, or in particulate form. In some embodiments, the silica-carbon composite material is in particulate form. In some embodiments, the particles are spherical, having a diameter from about 100 nm to about 4 mm, or from about 5 µm to about 4 mm.

In some embodiments, the method further comprises metallothermically reducing at least a portion of the silica present in the silica-carbon composite material, forming a silicon-carbon composite material.

In some embodiments, metallothermically reducing comprises contacting the silica-carbon composite material with a metallic reducing agent at an elevated temperature and under an inert atmosphere for a period of time sufficient to reduce a substantial portion of the silica to silicon.

In some embodiments, the metallic reducing agent comprises magnesium, calcium, combinations thereof, or alloys thereof. In some embodiments, the metallic reducing agent comprises an alloy of magnesium or calcium with aluminum. In some embodiments, the metallic reducing agent is magnesium. In some embodiments, the magnesium is in bulk form, in the form of turnings, or in particulate form. In some embodiments, the magnesium is in particulate form having a particle size from about 0.3 to about 300 micrometers.

In some embodiments, the elevated temperature is from about 450 to about 900° C.

In some embodiments, the method further comprises washing the silicon-carbon composite material with an acid. In some embodiments, the acid is a solution of hydrochloric acid, phosphoric acid, hydrofluoric acid, or combinations thereof.

In a still further aspect is provided a silica-carbon composite material prepared by the method as disclosed herein.

In yet another aspect is provided a silicon-carbon composite material prepared by the method as disclosed herein.

In yet a further aspect is provided a silicon-carbon composite material comprising carbon material of low bulk density, the carbon material comprising a skeletal framework comprising carbon nanofibers, the skeletal framework forming a pore structure comprising an array of interconnected pores, the silicon-carbon composite material further comprising a conformal coating layer of silicon on the carbon nanofibers.

BRIEF DESCRIPTION OF THE DRAWINGS

In order to provide an understanding of embodiments of the technology, reference is made to the appended drawings, which are not necessarily drawn to scale. The drawings are exemplary only, and should not be construed as limiting the technology. The disclosure described herein is illustrated by way of example and not by way of limitation in the accompanying figures.

DETAILED DESCRIPTION

Figure 1:
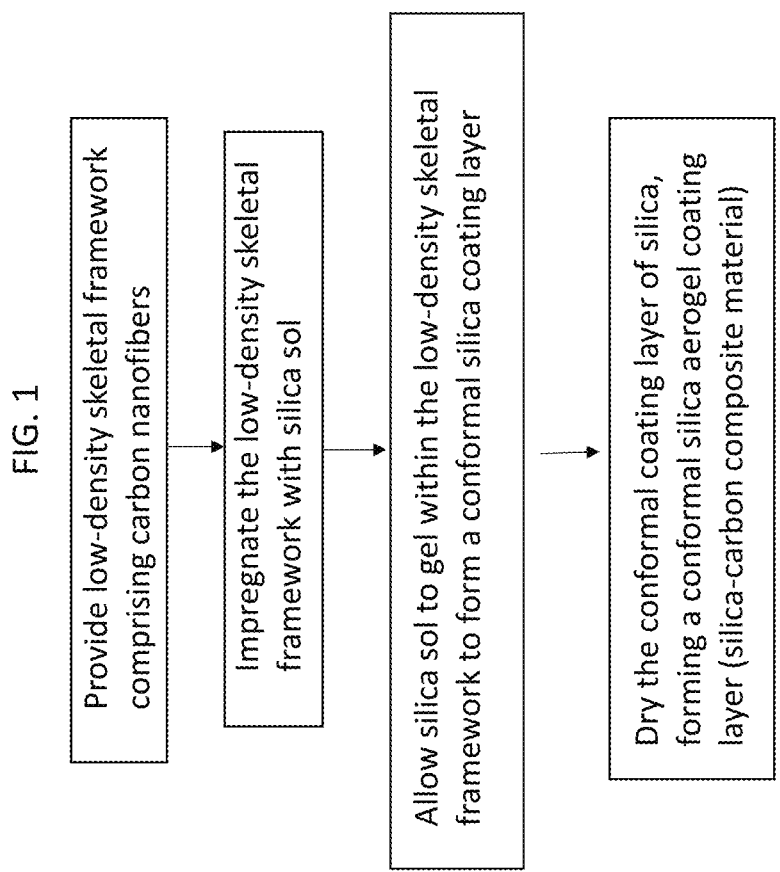
FIG. 1 is a flow chart depicting a non-limiting embodiment of the disclosed method.

Before describing several example embodiments of the technology, it is to be understood that the technology is not limited to the details of construction or process steps set forth in the following description. The technology is capable of other embodiments and of being practiced or being carried out in various ways.

In general, the technology is directed to nanoporous carbon-based materials including a nano-thin coating of silica or silicon. Specifically, the technology is directed to composite material comprising carbon material of low envelope density, the carbon material comprising a skeletal framework comprising carbon nanofibers, the skeletal framework forming a pore structure comprising an array of interconnected pores, wherein the carbon nanofibers are plated at the nanostructured level with a layer of nano-thin silica or silicon. Further disclosed are methods for preparation of such materials. Each of the materials and methods are described further herein below.

Definitions

With respect to the terms used in this disclosure, the following definitions are provided. This application will use the following terms as defined below unless the context of the text in which the term appears requires a different meaning.

The articles "a" and "an" are used herein to refer to one or to more than one (i.e., to at least one) of the grammatical object of the article. The term "about" used throughout this specification is used to describe and account for small fluctuations. For example, the term "about" can refer to less than or equal to ±10%, or less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" of course includes the specific value. For instance, "about 5.0" must include 5.0.

Within the context of the present disclosure, the terms "framework" or "framework structure" refer to the network of interconnected oligomers, polymers, or colloidal particles that form the solid structure of a gel or an aerogel. The polymers or particles that make up the framework structures typically have a diameter of about 100 angstroms. However, framework structures of the present disclosure can also include networks of interconnected oligomers, polymers, or colloidal particles of all diameter sizes that form the solid structure within in a gel or aerogel.

As used herein, the term "aerogel" or "aerogel material" refers to a solid object, irrespective of shape or size, comprising a framework of interconnected solid structures, with a corresponding network of interconnected pores integrated within the framework, and containing gases such as air as a dispersed interstitial medium. As such, aerogels are open non-fluid colloidal or polymer networks that are expanded throughout their whole volume by a gas. Aerogels are generally prepared by removing the solvent from a gel (a solid network that contains a solvent) in a manner such that minimal or no contraction of the gel can be brought by capillary forces at its pore walls, in other words, by the removal of all swelling agents from a corresponding wet-gel without substantial volume reduction or network compaction. Methods of solvent removal include, but are not limited to, supercritical drying (or drying using supercritical fluids, such that the low surface tension of the supercritical fluid exchanges with the transient solvent within the gel), exchange of solvent with supercritical fluid, exchange of solvent with fluid that is subsequently transformed to the supercritical state, sub- or near-critical fluid drying, and sublimating a frozen solvent in a freeze-drying process. See for example, PCT Patent Application Publication No. WO2016127084A1.

Aerogels include a highly porous network of micro-, meso-, and macro-sized pores, and are generally characterized by the following physical and structural properties (according to nitrogen porosimetry testing and helium pycnometry) attributable to aerogels: (a) an average pore diameter ranging from about 2 nm to about 100 nm; (b) a porosity of at least 60% or more, and (c) a specific surface area of about 100 $m^2/g$ or more, such as from about 100 to about 1000 $m^2/g$ by nitrogen sorption analysis.

Aerogels can be formed of inorganic materials, organic materials, or mixtures thereof. When formed of organic materials such as, for example, phenols, resorcinol-formaldehyde (RF), phloroglucinol-furfuraldehyde (PF), polyacrylonitrile (PAN), polyimide (PI), polyurethane (PU), polyurea (PUA), polyamine (PA), polybutadiene, polydicyclopentadiene, and precursors or polymeric derivatives thereof, the organic aerogel may be carbonized (e.g., by pyrolysis) to form a carbon aerogel, which can have properties (e.g., pore volume, pore size distribution, morphology, etc.) that differ or overlap from each other, depending on the precursor materials and methodologies used.

Aerogel materials of the present disclosure (e.g., polyimide, carbon, silica, or silicon) thus include any aerogels or other open-celled compounds, which satisfy the defining elements set forth in previous paragraphs.

As used herein, the terms "xerogel" and "ambigel" refer to gels comprising an open, non-fluid colloidal or polymer network that is formed by the removal of all swelling agents from a corresponding wet-gel without any precautions taken to avoid substantial volume reduction or compaction, such as under ambient pressure drying. In contrast to an aerogel, a xerogel, such as a silica xerogel, generally comprises a compact structure. Xerogels suffer substantial volume reduction during ambient pressure drying, and can have lower surface areas compared to aerogels, such as 0-100 $m^2/g$, or from about 0 to about 20 $m^2/g$ as measured by nitrogen sorption analysis.

As used herein, the term "wet-gel" refers to a gel in which the mobile interstitial phase within the network of interconnected pores is primarily comprised of a liquid phase such as a conventional solvent, liquefied gases such as liquid carbon dioxide, or a combination thereof. Aerogels and xerogels typically require the initial production of a wet-gel, followed by processing and drying to replace the mobile interstitial liquid phase in the wet-gel with air or another gas. Examples of wet-gels include, but are not limited to: alcogels, hydrogels, ketogels, carbonogels, and any other wet-gels known to those in the art.

Silica-Carbon Composite Materials

In aspects of the disclosure are provided a silica-carbon composite material. The silica-carbon composite material comprises a low bulk density carbon material comprising carbon nanofibers, the low bulk density carbon material having a pore structure comprising an array of interconnected pores. The silica-carbon composite material further comprises a conformal coating layer of silica on the carbon nanofibers. Each of the components comprising the silica-carbon composite material are described further herein below.

Low Bulk Density Skeletal Framework

The silica-carbon composite material comprises a low bulk density carbon material comprising a skeletal framework comprising carbon nanofibers, the skeletal framework forming a pore structure comprising an array of interconnected pores. Such materials may be described as possessing a fibrillar morphology. Within the context of the present disclosure, the term "fibrillar morphology" refers to the structural morphology of a nanoporous material (e.g., a carbon aerogel) being inclusive of struts, rods, fibers, or filaments.

As used herein, the term "density" refers to a measurement of the mass per unit volume of a material (e.g., a carbon material as described herein). The term "density" generally refers to the true or skeletal density of a material, as well as to the bulk density of a material or composition. Density is typically reported as $kg/m^3$ or $g/cm^3$. The skeletal density of a material, such as a carbon aerogel, may be determined by methods known in the art, including, but not limited to helium pycnometry. The bulk density of a material, also referred to as "envelope density," may be determined by methods known in the art, including, but not limited to: Standard Test Method for Dimensions and Density of Preformed Block and Board-Type Thermal Insulation (ASTM C303, ASTM International, West Conshohocken, Pa.); Standard Test Methods for Thickness and Density of Blanket or Batt Thermal Insulations (ASTM C167, ASTM International, West Conshohocken, Pa.); or Determination of the apparent density of preformed pipe insulation (ISO 18098, International Organization for Standardization, Switzerland). Within the context of the present disclosure, density measurements are acquired according to ASTM C167 standards, unless otherwise stated. In some embodiments, the low bulk density carbon materials as disclosed herein have a bulk density from about 0.01 to about 0.3 $g/cm^3$.

Low bulk density carbon materials as disclosed herein, such as carbon aerogels, have a pore size distribution. As used herein, the term "pore size distribution" refers to the statistical distribution or relative amount of each pore size within a sample volume of a porous material. A narrower pore size distribution refers to a relatively large proportion of pores at a narrow range of pore sizes. In some embodiments, a narrow pore size distribution may be desirable in e.g., optimizing the amount of pores that can surround an electrochemically active species and maximizing use of the available pore volume. Conversely, a broader pore size distribution refers to relatively small proportion of pores at a narrow range of pore sizes. As such, pore size distribution is typically measured as a function of pore volume and recorded as a unit size of a full width at half max of a predominant peak in a pore size distribution chart. The average pore size of a porous material may be determined by methods known in the art, for example including, but not limited to, surface area, skeletal density, and porosimetry, from which pore size distribution can also be calculated. Suitable methods for determination of such features include, but are not limited to, measurements of gas adsorption/desorption (e.g., nitrogen), helium pycnometry, mercury porosimetry, and the like. Measurements of pore size distribution reported herein are acquired by nitrogen sorption analysis unless otherwise stated. In certain embodiments, low bulk density carbon materials of the present disclosure have a relatively narrow pore size distribution.

Low bulk density carbon materials as disclosed herein have a pore volume. As used herein, the term "pore volume" refers to the total volume of pores within a sample of porous material. Pore volume is specifically measured as the volume of void space within the porous material, and is typically recorded as cubic centimeters per gram (cm$^3$/g or cc/g). The pore volume of a porous material may be determined by methods known in the art, for example including, but not limited to, surface area and porosity analysis (e.g. nitrogen porosimetry, mercury porosimetry, helium pycnometry, and the like). In certain embodiments, low bulk density carbon materials of the present disclosure, such as carbon aerogels, have a pore volume of about 0.03 cc/g or more, 0.1 cc/g or more, 0.3 cc/g or more, 0.6 cc/g or more, 0.9 cc/g or more, 1 cc/g or more, 1.2 cc/g or more, 1.5 cc/g or more, 1.8 cc/g or more, 2 cc/g or more, 2.1 cc/g or more, 2.4 cc/g or more, 2.5 cc/g or more, 2.7 cc/g or more, 3 cc/g or more, 3.3 cc/g or more, 3.5 cc/g or more, 3.6 cc/g or more, 4 cc/g or more, or in a range between any two of these values.

Suitable low bulk density carbon materials may be provided according to any known method, or may be purchased. In some embodiments, the low-density skeletal framework is a carbon aerogel. In some embodiments, the carbon aerogel is obtained from the carbonization of a suitable organic aerogel, such as a polyimide aerogel.

Silica Coating

Figure 4B:
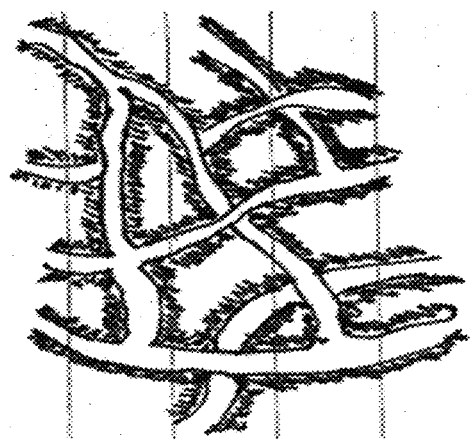
FIGS. 4A and 4B are cartoon illustrations of carbon aerogel fibers and carbon aerogel fibers coated with a layer of silicon according to a non-limiting embodiment of the disclosure, respectively.
Figure 4A:
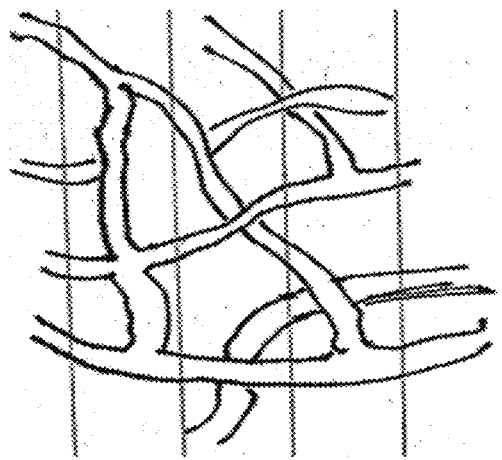

The silica-carbon composite materials as disclosed herein comprise a conformal coating layer of silica on the carbon nanofibers of the skeletal framework. As used herein, the term "conformal coating layer" refers to a uniform, thin film which generally conforms to the contours of the carbon nanofibers. One of skill in the art will recognize that such conformal coating layers, by virtue of their nature (i.e., consisting of silica nanoparticles) and the arrangement of the silica nanoparticles thereof, such as those projecting upwards from the surface, may not be entirely smooth, but generally reflect the topology of the underlying surface. A non-limiting cartoon illustration is provided in FIGS. 4A and 4B, which show exemplary carbon fiber structures and exemplary carbon fiber structures coated with a nano-thin layer of silica coating, respectively. In some embodiments, substantially no silica is present within the pores, meaning the pores themselves are substantially free of silica beyond the coating layer on the surface of the carbon nanofibers and extending therefrom into said pores, and only trace amounts of particulate silica may reside loose within the pores.

In some embodiments, the silica coating is amorphous. As used herein, the term "amorphous" means that the silica is not crystalline.

The thickness of the silica coating layer may vary. In some embodiments, the conformal coating layer of silica has a thickness from about 1 to about 20 nm, such as from about 1, about 2, about 3, about 4, about 5 nm, about 6, about 7, about 8, about 9, or about 10 nm, to about 11, about 12, about 13, about 14, about 15, about 16, about 17, about 18, about 19, or about 20 nm.

In some embodiments, the silica consists of silica particles. In some embodiments, the coating layer of silica is porous. In some embodiments, the porous coating layer of silica is present as a silica aerogel coating layer. In some embodiments, the porous coating layer of silica is present as a silica xerogel coating layer.

The amount of silica present in the silica-carbon composite material varies according to the density of the low bulk density carbon material, with lower densities resulting in higher weight percent incorporation of silica. In some embodiments, the silica-carbon composite material comprises silica in an amount by weight from about 30 to about 70%, such as from about 30, about 35, about 40, about 45, or about 50, to about 55, about 60, about 65, or about 70% silica by weight. In some embodiments, the silica-carbon composite material comprises silica in an amount by weight from about 40 to about 70%.

The silica-carbon composite material may be in a variety of different physical forms. In some embodiments, the silica-carbon composite material can take the form of a monolith. As used herein, the term "monolith" refers to materials in which a majority (by weight) of the low-density skeletal framework included in the silica-carbon composite material is in the form of a unitary, continuous, self-supporting object. With reference to aerogel materials, monolithic aerogel materials include aerogel materials which are initially formed to have a well-defined shape, but which can be subsequently cracked, fractured or segmented into non-self-repeating objects. For example, irregular chunks may be considered as monoliths. Monolithic aerogels may take the form of a freestanding structure, or a reinforced material with fibers or an interpenetrating foam.

In some embodiments, the silica-carbon composite material may be in the form of thin sheets. In other embodiments, the silica-carbon composite material may be in particulate form, for example as beads or particles from, e.g., crushing a monolithic material. As used herein, the term "beads" is meant to include discrete small units or pieces having a generally spherical shape. In some embodiments, the silica-carbon composite material beads are substantially spherical. The silica-carbon composite material in particulate form can have various particle sizes. In the case of spherical particles (e.g., beads), the particle size is the diameter of the particle. In the case of irregular particles, the term particle size refers to the maximum dimension (e.g., a length, width, or height). The particle size may vary depending on the physical form, preparation method, and any subsequent physical steps performed. In some embodiments, the silica-carbon composite material in particulate form can have a particle size from about 1 micrometer to about 10 millimeters. For example, the silica-carbon composite material in particulate form can have a particle size of about 1 micrometer, about 2 micrometers, about 3 micrometers, about 4 micrometers, about 5 micrometers, about 6 micrometers, about 7 micrometers, about 8 micrometers, about 9 micrometers, about 10 micrometers, about 15 micrometers, about 20 micrometers, about 25 micrometers, about 30 micrometers, about 35 micrometers, about 40 micrometers, about 45 micrometers, about 50 micrometers, about 60 micrometers, about 70 micrometers, about 80 micrometers, about 90 micrometers, about 100 micrometers, about 200 micrometers, about 300 micrometers, about 400 micrometers, about 500 micrometers, about 600 micrometers, about 700 micrometers, about 800 micrometers, about 900 micrometers, about 1 millimeter, about 2 millimeters, about 3 millimeters, about 4 millimeters, about 5 millimeters, about 6 millimeters, about 7 millimeters, about 8 millimeters, about 9 millimeters, about 10 millimeters, or in a range between any two of these values. In some embodiments, the silica-carbon composite material in particulate form can have a particle size from about 100 nm to about 4 mm. In some embodiments, the silica-carbon composite material can have a particle size in the range of about 5 micrometers to about 100 micrometers, or from about 5 to about 50 micrometers. In some embodiments, the silica-carbon composite material can have a particle size in the range of about 5 micrometers to about 4 mm. In some embodiments, the silica-carbon composite material can have a particle size in the range of about 1 to about 4 millimeters.

Methods of Preparing Silica-Carbon Composite Materials

In aspects of the disclosure are provided methods of preparing the silica-carbon composite material as described herein. In a first aspect, the method comprises providing a carbon material of low bulk density comprising a skeletal framework comprising carbon nanofibers; and coating the carbon nanofibers with silica to form the conformal coating layer of silica. In some embodiments, the method follows the sequence illustrated in the exemplary flowchart of FIG. 1. Each of these steps are discussed below in greater detail.

With reference to FIG. 1, the method comprises providing a carbon material of low bulk density comprising a skeletal framework comprising carbon nanofibers. Suitable low bulk density carbon materials may be provided according to any known method, or may be purchased. In some embodiments, the low bulk density carbon material is a carbon aerogel. In some embodiments, the carbon aerogel material is obtained from the carbonization of a suitable organic aerogel, such as a polyimide aerogel.

With further reference to FIG. 1, the method comprises coating the carbon nanofibers with silica to form the conformal coating layer of silica. In some embodiments, coating the carbon nanofibers with silica comprises: impregnating pores of the low bulk density carbon material with a silica sol; and allowing the silica sol to gel, spontaneously forming the conformal coating layer of silica on the carbon nanofibers. In some embodiments, the silica is amorphous. Generally, the low bulk density carbon material is immersed in a silica sol, allowing the silica sol to be drawn by capillary action into the pores of the low bulk density framework.

Generally, the silica sol comprises a silica precursor. The target density of the silica sol may vary. In some embodiments, the target density is from about 0.01 to about 0.3 g·cm$^3$. In some embodiments, the silica sol comprises tetraethyl orthosilicate, tetramethyl orthosilicate, sodium silicate, methyl triethoxysilane, pre-hydrolyzed pre-polymers of ethyl polysilicate, methyl polysilicate, polydimethylsiloxane, or combinations thereof. In some embodiments, the silica sol comprises tetraethyl orthosilicate, tetramethyl orthosilicate, methyl triethoxysilane, polydimethylsiloxane, or a combination thereof.

In some embodiments, the silica sol further comprises a solvent. In some embodiments, the solvent is an alcohol, such as methanol or ethanol.

In some embodiments, the silica sol is pre-catalyzed. In some embodiments, the pre-catalyst is a mineral acid, such as, but not limited to, aqueous sulfuric acid. In some embodiments, the silica sol comprising the solvent and acid is allowed to hydrolyze for a period of time, such as 12 hours, diluted with additional solvent and water, and allowed to further hydrolyze.

In some embodiments, the silica sol is catalyzed. In some embodiments, the silica sol is catalyzed with aqueous ammonia. In some embodiments, aqueous ammonia is added to the pre-catalyzed silica sol to afford the catalyzed silica sol.

The silica sol or sols are allowed to contact the carbon aerogel for a period of time sufficient to allow the silica sol to fully impregnate the porous carbon structure. For example, in some embodiments, the carbon aerogel material is immersed in the silica sol for a period of time from about 12 hours to about 72 hours, or from about 24 to about 48 hours.

In some embodiments, the impregnating the low-density skeletal framework comprises first impregnating pores of the carbon material with a pre-catalyzed sol, then impregnating the pores of the carbon material with a catalyzed sol.

The silica sol or sols are then allowed to gel within the pores of the carbon material. Surprisingly, silica is not randomly distributed in the pores of the carbon material but is segregated on the skeletal nanofibers, forming a conformal layer of silica on the carbon nanofibers. The gelation is allowed to proceed for a period of time until complete. Generally, gelation is complete with about an hour or less, such as within about 45 minutes, or about 30 minutes, or about 20 minutes.

Following complete gelation of the silica sol, the silica-carbon composite material is allowed to cure for a period of time. The period of time and temperature for curing may vary. For example, in some embodiments, the silica-carbon composite material is allowed to cure for a period of time ranging from about 4 hours to about 48 hours. In some embodiments, the temperature is about 20° C. In some embodiments, the temperature is elevated, such as up to about 70° C. In some embodiments, the curing is performed for 4 hours at about 68° C., or for about 48 hours at about 20° C.

Following the curing, the resulting silica-carbon composite material may be washed (i.e., solvent exchanged) in a suitable secondary solvent. Suitable secondary solvents may be linear alcohols with 1 or more aliphatic carbon atoms, diols with 2 or more carbon atoms, branched alcohols, cyclic alcohols, alicyclic alcohols, aromatic alcohols, polyols, ethers, ketones, cyclic ethers or their derivatives. In some embodiments, the secondary solvent is ethanol. In some embodiments, the washing is performed at an elevated temperature. In some embodiments, the washing is performed for 48 hours at about 68° C.

In some embodiments, the method further comprises drying the conformal coating layer of silica under ambient conditions, forming a conformal silica xerogel coating layer. In some embodiments, the method further comprises drying the conformal coating layer of silica under supercritical conditions, forming a conformal silica aerogel coating layer. Once the silica-carbon composite material (monolith, film, particles, or beads) has been formed and processed, the solvent can then be at least partially extracted using extraction methods, including processing and extraction techniques, to form a silica xerogel or aerogel coating layer. Liquid phase extraction, among other factors, plays an important role in engineering the characteristics of aerogels, such as porosity and density, as well as related properties such as thermal conductivity. Generally, aerogels are obtained when a liquid phase is extracted from a wet-gel in a manner that causes low shrinkage to the porous network and framework of the wet-gel. Wet-gels can be dried using various techniques to provide aerogel materials. In exemplary embodiments, wet-gel materials can be dried at ambient pressure, under vacuum (e.g., through freeze drying), at subcritical conditions, or at supercritical conditions to form the corresponding dry gel (e.g., silica xero- or aerogel).

Aerogels are commonly formed by removing the liquid phase from the pores of the wet-gel material at a temperature and pressure near or above the critical point of the liquid mobile phase. Once the critical point is reached (near critical) or surpassed (supercritical; i.e., pressure and temperature of the system is at or higher than the critical pressure and critical temperature, respectively) a new supercritical phase appears in the fluid that is distinct from the liquid or vapor phase. The solvent can then be removed without introducing a liquid-vapor interface, capillary forces, or any associated mass transfer limitations typically associated with receding liquid-vapor boundaries. Additionally, the supercritical phase is more miscible with organic solvents in general, thus having the capacity for better extraction. Co-solvents and solvent exchanges are also commonly used to optimize the supercritical fluid drying process.

Wet-gels (e.g., the silica conformal coating layer in the carbon aerogel) can be dried using various techniques to provide aerogel materials. In example embodiments, wet-gel material can be dried at ambient pressure, at subcritical conditions, or at supercritical conditions. In some embodiments, the wet-gel material is dried under subcritical or supercritical conditions. In an example embodiment of supercritical drying, the gel material can be placed into a high-pressure vessel for extraction of solvent with supercritical $CO_2$. After removal of the solvent, e.g., ethanol, the vessel can be held above the critical point of $CO_2$ for a period of time, e.g., about 30 minutes. Following supercritical drying, the vessel is depressurized to atmospheric pressure. Generally, aerogels are obtained by this process.

In an example embodiment of subcritical drying, the silica-carbon composite material is dried using liquid $CO_2$ at a pressure in the range of about 800 psi to about 1200 psi at room temperature. This operation is quicker than supercritical drying; for example, the solvent (e.g., ethanol) can be extracted in about 15 minutes. Generally, aerogels are obtained by this process.

Several additional aerogel extraction techniques are known in the art, including a range of different approaches in the use of supercritical fluids in drying aerogels, as well as ambient drying techniques. For example, Kistler (J. Phys. Chem. (1932) 36: 52-64) describes a simple supercritical extraction process where the gel solvent is maintained above its critical pressure and temperature, thereby reducing evaporative capillary forces and maintaining the structural integrity of the gel network. U.S. Pat. No. 4,610,863 describes an extraction process where the gel solvent is exchanged with liquid carbon dioxide, which is subsequently removed under conditions where carbon dioxide is in a supercritical state. U.S. Pat. No. 6,670,402 teaches extracting a liquid phase from a gel via rapid solvent exchange by injecting supercritical (rather than liquid) carbon dioxide into an extractor that has been pre-heated and pre-pressurized to substantially supercritical conditions or above, thereby producing aerogels. U.S. Pat. No. 5,962,539 describes a process for obtaining an aerogel from a polymeric material that is in the form of a sol-gel in an organic solvent, by exchanging the organic solvent for a fluid having a critical temperature below a temperature of polymer decomposition, and supercritically extracting the fluid from the sol-gel. U.S. Pat. No. 6,315,971 discloses a process for producing gel compositions comprising: drying a wet gel comprising gel solids and a drying agent to remove the drying agent under drying conditions sufficient to reduce shrinkage of the gel during drying. U.S. Pat. No. 5,420,168 describes a process whereby resorcinol/formaldehyde aerogels can be manufactured using a simple air-drying procedure. U.S. Pat. No. 5,565,142 describes drying techniques in which the gel surface is modified to be stronger and more hydrophobic, such that the gel framework and pores can resist collapse during ambient drying or subcritical extraction. Other examples of extracting a liquid phase from aerogel materials can be found in U.S. Pat. Nos. 5,275,796 and 5,395,805.

In some embodiments, extracting the liquid phase from the pores of the silica-carbon composite material uses supercritical conditions of carbon dioxide, including, for example: first substantially exchanging the primary solvent present in the pore network of the gel with liquid carbon dioxide; and then heating the wet-gel (typically in an autoclave) beyond the critical temperature of carbon dioxide (about 31.06° C.) and increasing the pressure of the system to a pressure greater than the critical pressure of carbon dioxide (about 1070 psig). The pressure around the gel material can be slightly fluctuated to facilitate removal of the supercritical carbon dioxide fluid from the gel. Carbon dioxide can be recirculated through the extraction system to facilitate the continual removal of the primary solvent from the wet gel. Finally, the temperature and pressure are slowly returned to ambient conditions to produce a dry aerogel material. Carbon dioxide can also be pre-processed into a supercritical state prior to being injected into an extraction chamber. In other embodiments, extraction can be performed using any suitable mechanism, for example altering the pressures, timings, and solvent discussed above.

Surprisingly, according to the present disclosure, it was found that in certain embodiments, following ambient or supercritical drying, the silica present in the silica-carbon composite material did not have the usual nanoparticulate nanostructure of bulk silica. Instead, it formed a conformal coating on the carbon nanofibers. Specifically, the silica coating was present as a uniform, nano-thin layer which coated the individual fibers of the carbon aerogel.

The thickness of the silica coating layer may vary. In some embodiments, the conformal coating layer of silica has a thickness from about 1 to about 20 nm, such as from about 1, about 2, about 3, about 4, about 5 nm, about 6, about 7, about 8, about 9, or about 10 nm, to about 11, about 12, about 13, about 14, about 15, about 16, about 17, about 18, about 19, or about 20 nm.

The amount of silica present in the silica-carbon composite material varies according to the density of the low bulk density carbon material, with lower densities resulting in higher weight percent incorporation of silica. In some embodiments, the silica-carbon composite material comprises silica in an amount by weight from about 30 to about 80%, such as from about 30, about 35, about 40, about 45, or about 50, to about 55, about 60, about 65, or about 70% silica by weight. In some embodiments, the silica-carbon composite material comprises silica in an amount by weight from about 40 to about 70%.

In another aspect, the method comprises providing a fibrous polyimide aerogel; impregnating the fibrous polyimide aerogel with a silica sol; allowing the silica sol to gel, forming the conformal coating layer of silica on the polyimide aerogel fibers; drying the silica coated polyimide aerogel under ambient or supercritical conditions to form a silica xero- or aerogel coating layer on the polyimide aerogel fibers; and pyrolyzing the silica coated polyimide aerogel to form the silica-carbon composite material. In some embodiments, the method follows the sequence illustrated in the exemplary flowchart of FIG. 2. Each of these steps are discussed below in greater detail.

Figure 2:
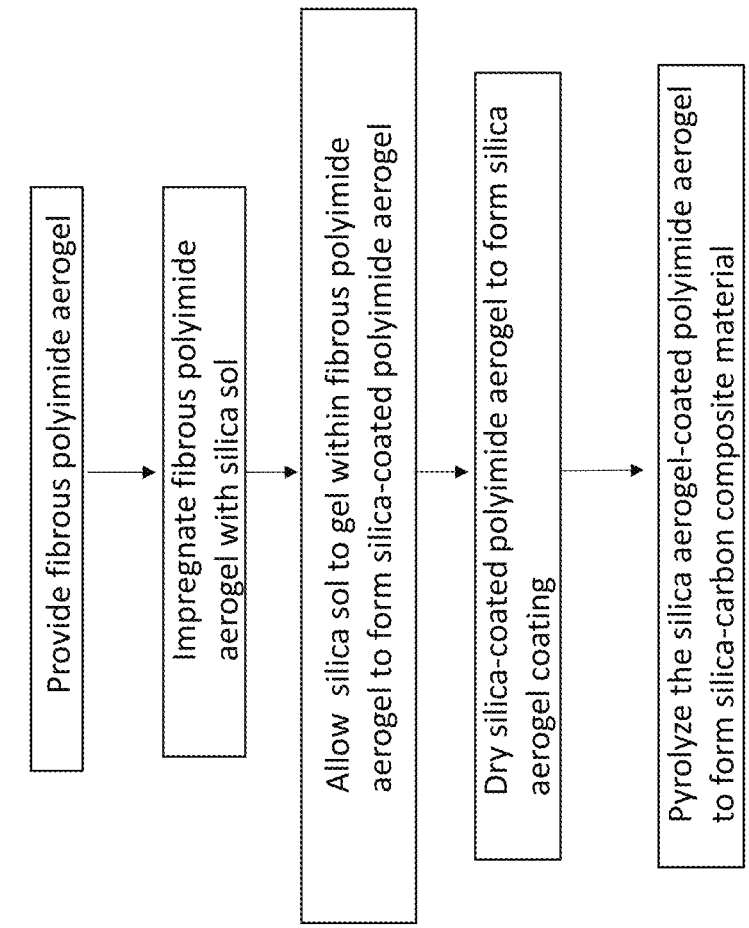
FIG. 2 is a flow chart depicting another non-limiting embodiment of the disclosed method.

With reference to FIG. 2, the method comprises providing a fibrous polyimide aerogel. Suitable fibrous polyimide aerogels may be provided according to any known method, or may be prepared according to the methods disclosed herein (e.g., from dehydration of a polyamic acid prepared from suitable anhydride and diamine components, followed by drying under appropriate conditions). The preparative method may be water-based or solvent based as disclosed herein in Examples 2, 3, and 4.

Each of the impregnation, gelation, and drying are performed as disclosed herein above with reference to coating low bulk density carbon materials. The dried fibrous polyimide aerogel (monolithic, thin film, particulate, or beads) as disclosed herein is then carbonized, meaning the polyimide aerogel is heated at a temperature and for a time sufficient to convert substantially all of the organic material into carbon. The time and temperature required may vary. In some embodiments, the dried polyimide aerogel is subjected to a treatment temperature of 400° C. or above, 600° C. or above, 800° C. or above, 1000° C. or above, 1200° C. or above, 1400° C. or above, 1600° C. or above, 1800° C. or above, 2000° C. or above, 2200° C. or above, 2400° C. or above, 2600° C. or above, 2800° C. or above, or in a range between any two of these values, for carbonization of the polyimide aerogel.

Surprisingly, according to the present disclosure, it was found that following the carbonization, the silica present in the silica-carbon composite formed a coating layer having the same morphology as that in the silica-carbon composites prepared by the impregnation of low bulk density carbon materials comprising carbon nanofibers. Without wishing to be bound by any particular theory, it is believed that the silica sol forms an association with polar groups present on the surface of the carbon or polyimide nanofibers of the carbon or polyimide fibrous materials, respectively, such as residual —OH, —NH, amide, or imide groups, which template the conformal coating.

The thickness of the silica coating layer may vary. In some embodiments, the conformal coating layer of silica has a thickness from about 1 to about 20 nm, such as from about 1, about 2, about 3, about 4, about 5 nm, about 6, about 7, about 8, about 9, or about 10 nm, to about 11, about 12, about 13, about 14, about 15, about 16, about 17, about 18, about 19, or about 20 nm.

The amount of silica present in the silica-carbon composite material varies according to the density of the low bulk density carbon material, with lower densities resulting in higher weight percent incorporation of silica. In some embodiments, the silica-carbon composite material comprises silica in an amount by weight from about 30 to about 80%, such as from about 30, about 35, about 40, about 45, or about 50, to about 55, about 60, about 65, or about 70% silica by weight. In some embodiments, the silica-carbon composite material comprises silica in an amount by weight from about 40 to about 70%.

Methods of Preparing Silicon-Carbon Composite Materials

Figure 3:
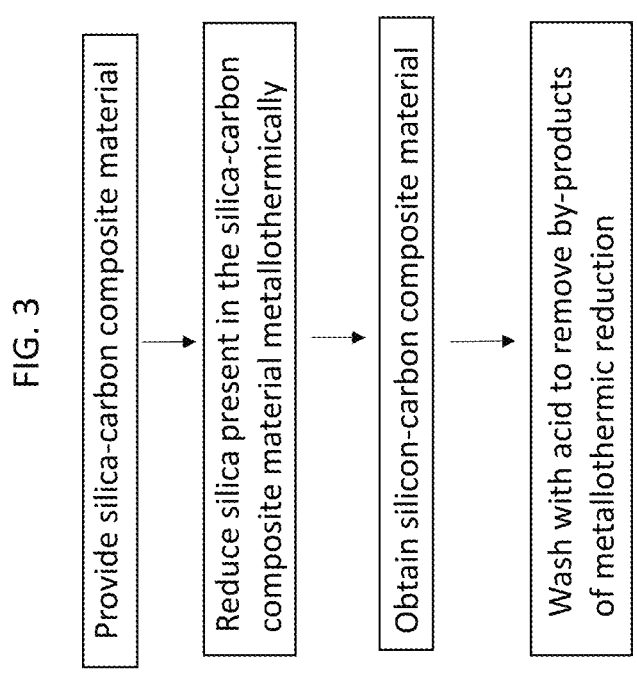
FIG. 3 is a flow chart depicting further non-limiting embodiments of the disclosed method.

In some embodiments, the methods as disclosed herein further comprise metallothermically reducing at least a portion of the silica present in the silica coating layer of the silica-carbon composite material, forming a silicon-carbon composite material. In some embodiments, the method follows the sequence illustrated in the exemplary flowchart of FIG. 3. With reference to FIG. 3, the method comprises providing a silica-carbon composite material as disclosed herein, and reducing at least a portion of the silica metallothermically.

Metallothermic Reduction

The metallothermic reduction of silica generally occurs according to the following chemical equation (Eq. 1)

$$2M + SiO_2 \rightarrow Si + 2MO \quad \text{(Eq. 1).}$$

In some embodiments, metallothermically reducing comprises contacting the silica-carbon composite material with a metallic reducing agent at an elevated temperature and for a period of time sufficient to reduce a substantial portion of the silica to silicon. The metallic reducing agent may vary, but generally includes any elemental metal which can reduce silica to silicon while undergoing oxidation to the corresponding metal oxide. Examples of suitable metallic reducing agents include, but are not limited to, magnesium, calcium, combinations thereof, and alloys thereof, for example, alloys with aluminum. In some embodiments, the metallic reducing agent is magnesium. In some embodiments, the magnesium is in particulate form having a particle size from about 0.3 to about 300 micrometers. In some embodiments, the magnesium is in bulk form, such as larger pieces, chunks, and the like. In some embodiments, the magnesium is in the form of turnings, such as turnings having a size range from about 5 to about 25 mm.

Initiation of the reaction requires exposure to elevated temperatures. Without wishing to be bound by theory, it is believed that exposure to elevated temperatures may vaporize at least a portion of the metallic reducing agent, facilitating reaction with the silica present in the silica-carbon composite material. The temperature required to, e.g., vaporize the metal and/or initiate the reaction may vary based on the metal. In some embodiments, the elevated temperature is from about 450 to about 900° C., such as from about 450, about 500, about 550, or about 600, to about 650, about 700° C., about 750° C., about 800° C., about 850° C., or about 900° C. The metallothermic reduction is generally conducted under an inert atmosphere, such as nitrogen or argon, to avoid combustion of carbon.

The time required for the reduction may vary. In some embodiments, the reduction is conducted for a period of time from about 1 hour to about 12 hours, or from about 2 to about 7 hours.

Following the metallothermic reaction, at least a portion of the silica is present in the resulting silicon-carbon composite material as silicon. The extent of reduction may be determined using electron dispersive x-ray spectroscopy (EDS), by which atomic ratios of oxygen to silicon may be obtained. In some embodiments, the oxygen-to-silicon ratio is less than about 2.0 (i.e., less than silica, $SiO_2$). For example, in some embodiments, the oxygen-to-silicon is less than about 1.1, such as from about 0.5 to about 1.0.

In some embodiments, the silicon is present as a conformal layer on the carbon fibers and is isomorphic with the parent silica (i.e., the silicon is present as an aerogel layer).

Washing

With reference to FIG. 3, in some embodiments, the method further comprises washing the silicon-carbon composite material with an acid to remove the metallic oxide, e.g., magnesium oxide, present in the silicon-carbon aerogel material. The acid may vary, but is generally a solution of an acid in which the metallic oxides will dissolve by forming a soluble salt. In some embodiments, the acid is hydrochloric acid, phosphoric acid, hydrofluoric acid, or a combination thereof. In some embodiments, the acid is hydrochloric acid. In some embodiments, the acid, e.g., hydrochloric acid, has a concentration from about 0.1 to about 12 molar (M), such as from about 1 to about 6M. In some embodiments, following the washing, the silicon-carbon composite material comprises less than about 5% of magnesium by weight, based on atomic magnesium as determined by EDS.

All methods described herein can be performed in any suitable order unless otherwise indicated herein or otherwise clearly contradicted by context. The use of any and all examples, or exemplary language (e.g., "such as") provided herein, is intended merely to better illustrate the materials and methods and does not pose a limitation on the scope unless otherwise claimed. No language in the specification should be construed as indicating any non-claimed element as essential to the practice of the disclosed materials and methods.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, examples, and preferences herein.

Although the technology herein has been described with reference to particular embodiments, it is to be understood that these embodiments are merely illustrative of the principles and applications of the present technology. It will be apparent to those skilled in the art that various modifications and variations can be made to the method and apparatus of the present technology without departing from the spirit and scope of the technology. Thus, it is intended that the present technology include modifications and variations that are within the scope of the appended claims and their equivalents.

Reference throughout this specification to "one embodiment," "certain embodiments," "one or more embodiments" or "an embodiment" means that a particular feature, structure, material, or characteristic described in connection with the embodiment is included in at least one embodiment of the technology. Thus, the appearances of phrases such as "in one or more embodiments," "in certain embodiments," "in one embodiment" or "in an embodiment" in various places throughout this specification are not necessarily referring to the same embodiment of the technology. Furthermore, the particular features, structures, materials, or characteristics may be combined in any suitable manner in one or more embodiments. Any ranges cited herein are inclusive.

Aspects of the present technology are more fully illustrated with reference to the following examples. Before describing several exemplary embodiments of the technology, it is to be understood that the technology is not limited to the details of construction or process steps set forth in the following description. The technology is capable of other embodiments and of being practiced or being carried out in various ways. The following examples are set forth to illustrate certain aspects of the present technology and are not to be construed as limiting thereof.

EXAMPLES

The present invention may be further illustrated by the following non-limiting examples describing the methods.

Example 1. Preparation of Silica Sols

Example 1A. Pre-Catalyzed Silica Sol at Td of 0.04 g/Cm$^3$

Tetraethoxyorthosilicate (TEOS; 64.3 g) was combined with 48.8 g ethanol and mixed for 5 minutes. A solution of 0.03 g sulfuric acid and 10 g water was added slowly to the TEOS mixture. The resulting silica sol with a silica solid content of 0.13 g/mL was left to hydrolyze overnight. The next day, it was mixed with 46.2 g of ethanol and 31.5 g water and allowed to further hydrolyze for 30 minutes, after which it was diluted with 164.1 g of ethanol. This pre-catalyzed silica sol of target density (Td) 0.04 g/cm$^3$ was subsequently utilized for impregnation of carbon aerogel materials.

Example 1B. Pre-Catalyzed Silica Sol at Td of 0.10 g/Cm$^3$

A pre-catalyzed silica sol was prepared in identical fashion to Example 1A, but at a Td of 0.10 g/cm$^3$. This pre-catalyzed silica sol was subsequently utilized for impregnation of carbon aerogel materials.

Example 1C. Catalyzed Silica Sol at Td of 0.04 g/Cm$^3$

A catalyzed sol was prepared in an identical fashion to Example 1A, except that after the dilution with ethanol, 30% aqueous ammonia (0.45 g) was added to the pre-catalyzed silica sol. Gelation of this sol occurred in about 1 hour. This catalyzed silica sol of target density (Td) 0.04 g/cm$^3$ was subsequently utilized for impregnation of carbon aerogel materials.

Example 1D. Pre-Catalyzed Silica Sol at Td of 0.10 g/Cm$^3$

A catalyzed silica sol was prepared in identical fashion to Example 1C, but at a Td of 0.10 g/cm$^3$. This catalyzed silica sol was subsequently utilized for impregnation of carbon aerogel materials.

Example 2. Preparation of Low-Density Carbon Aerogel Monoliths Using Pyridine Catalyst Polyimide gels were prepared at a target density of 0.02 g/cm$^3$. Pyromellitic dianhydride (PMDA, 1.34 g) was mixed with 87.6 g dimethyl acetamide (DMAC) for 30 minutes. Phenylenediamine (PDA; 0.66 g; 1:1 mol/mol ratio relative to PMDA) was added and the mixture was stirred for 17 hours. Acetic anhydride (2.69 g, 4.3 mol/mol ratio relative to PMDA) was added and the solution was mixed for another 2 hours. Pyridine was added as catalyst (3.91 g) and the mixture was stirred for 2 minutes, then the sol was cast in Teflon molds with airtight lids. The molds were placed in an oven at 68° C. for 4 hours during which time gelation occurred. The gels were solvent-exchanged two times with ethanol at 68° C. over two days, then extracted using supercritical fluid $CO_2$. The polyimide aerogels were carbonized at 1050° C. for 2 hours. The carbon aerogels had a density of 0.03 g/cc.

Example 3. Preparation of Carbon Aerogel Monoliths Using Different Base Catalysts Example 3A. Guanidinium Hydroxide Base, Td 0.02 g/Cm$^3$ Polyimide gels were prepared at a target density of 0.02 g/cm$^3$. Pyromellitic dianhydride (PMDA, 1.88 g) was mixed with 92.04 g of dimethyl acetamide (DMAC) for 30 minutes. Phenylenediamine (PDA; 0.93 g; 1:1 mol/mol ratio relative to PDA) was added and the mixture was stirred for 17 hours. Guanidinium hydroxide (11.8 g, 1.6 M solution in water, 2.19 mol/mol ratio relative to PMDA) was mixed with 11.8 g water and stirred with the polyamic acid sol for 5 minutes. Acetic anhydride (3.77 g, 4.3 mol/mol ratio relative to PMDA) was added and the solution was mixed for another 5 minutes. The sol was cast in molds with airtight lids. Gelation occurred in about 30 minutes at room temperature. After overnight curing at room temperature, the gels were solvent-exchanged three times with ethanol at 68°

C., then processed as in Example 2. The density of the carbon aerogels was 0.128 g/cm³.

Example 3B. Guanidinium Hydroxide Base, Td 0.04 g/Cm³

Using a similar approach to Example 3A, polyimide aerogels of target density 0.04 g/cm³ were prepared. After processing, the density of the carbon aerogels was 0.205 g/cm³.

Example 3C. Tetrabutylammonium Hydroxide Base, Td 0.04 g/Cm³

Polyimide gels were prepared at a target density of 0.04 g/cm³. Pyromellitic dianhydride PMDA (3.72 g) was mixed with 89.71 g dimethyl acetamide (DMAC) for 30 minutes. Phenylenediamine (PDA, 1.85 g, 1:1 mol/mol ratio relative to PMDA) was added and the mixture was stirred for 17 hours. Tetra-N-butyl ammonium hydroxide (24.35 g of 40% solution in water, 2.2 mol/mol ratio relative to PMDA) was stirred with the polyamic acid sol for 5 minutes. Acetic anhydride (7.53 g, 4.3 mol/mol ratio relative to PMDA) was added and the sol was mixed for another 5 minutes. Gelation occurred in about 40 minutes at room temperature. The polyimide aerogels were carbonized at 1050° C. for 2 hours. The density of the carbon aerogels was 0.154 g/cm³.

Example 3D. Tetrabutylammonium Hydroxide Base, Reverse Addition, Td 0.04 g/Cm³

A similar approach to Example 3C was used to prepare polyimide gels using a reverse addition protocol. First, the PDA was dissolved in DMAC, followed by PMDA. The preparation and processing were otherwise identical as for the gels of Example 3C. The sols were more viscous in this case and the gelation times were shorter, about 15-20 minutes. The polyimide aerogels were carbonized at 1050° C. for 2 hours. The density of the carbon aerogels was 0.167 g/cm³.

Example 4. Preparation of Carbon Aerogel Monoliths Using Water Solvent

A solution of 1,4-phenylene diamine (PDA; 1.66 g, 15.3 mmol) in 100 ml of water was prepared. To this solution was added 2.2 equivalents of triethylamine (3.4 g, 33.7 mmol), followed by pyromellitic dianhydride (PMDA; 3.3 g, 15.3 mmol). The solution was stirred at room temperature for 5 days, and 4.3 equivalents of acetic anhydride (6.7 g, 65.8 mmol) was added at the end of this time. The solution was divided into cylindrical molds and gelled within approximately 3 minutes. The resulting gels were allowed to cure for 1 day. The gels were demolded by adding ethanol, and allowed to remain in the molds for a further 24 hours, then washed three times with ethanol. The resulting gels were treated with supercritical fluid carbon dioxide to form the polyimide aerogels. The polyimide aerogels were carbonized at 1050° C. for 2 hours. The carbonization yield was 40-42% after pyrolysis. The properties of these carbon aerogels are provided in Table 1.

TABLE 1

Properties of carbon aerogels of Example 4.

| Ex. # | bulk density (g/cc) | skeletal density (g/cc) | Porosity (% v/v) | BET surface area (m²/g) | Micropore surface area (m²/g) | Pore volume 1.7-300 nm (cm³/g) |
|---|---|---|---|---|---|---|
| Ex. 4-1 | 0.0532 | 2.3698 | 97.8 | 651 | 124 | 1.22 |
| Ex. 4-2 | 0.0950 | 2.6293 | 96.4 | 644 | 124 | 1.13 |
| Ex. 4-3 | 0.0730 | 2.4325 | 97.0 | 586 | 117 | 1.07 |

Example 5. Impregnation of Carbon Aerogels with Silica Sol

All carbon monoliths of Examples 2-4 were sanded with sandpaper on all sides for a more efficient infiltration with silica sol. The monolithic pieces were completely immersed for 20 hours in the pre-catalyzed silica sol of Example 1A or 1B. The carbon aerogels usually sank to the bottom in about 2-10 minutes. The monoliths were immersed a second time in the catalyzed silica sol of Example 1C or 1D. Gelation of the silica sol in and around the monoliths occurred in about 1 hour. After curing overnight, the excess silica gel was removed from around the carbon monolith pieces, and they were solvent-exchanged two times with ethanol at 68° C., then extracted using supercritical $CO_2$ to form the corresponding silica aerogel impregnated carbon aerogels.

Figure 5:
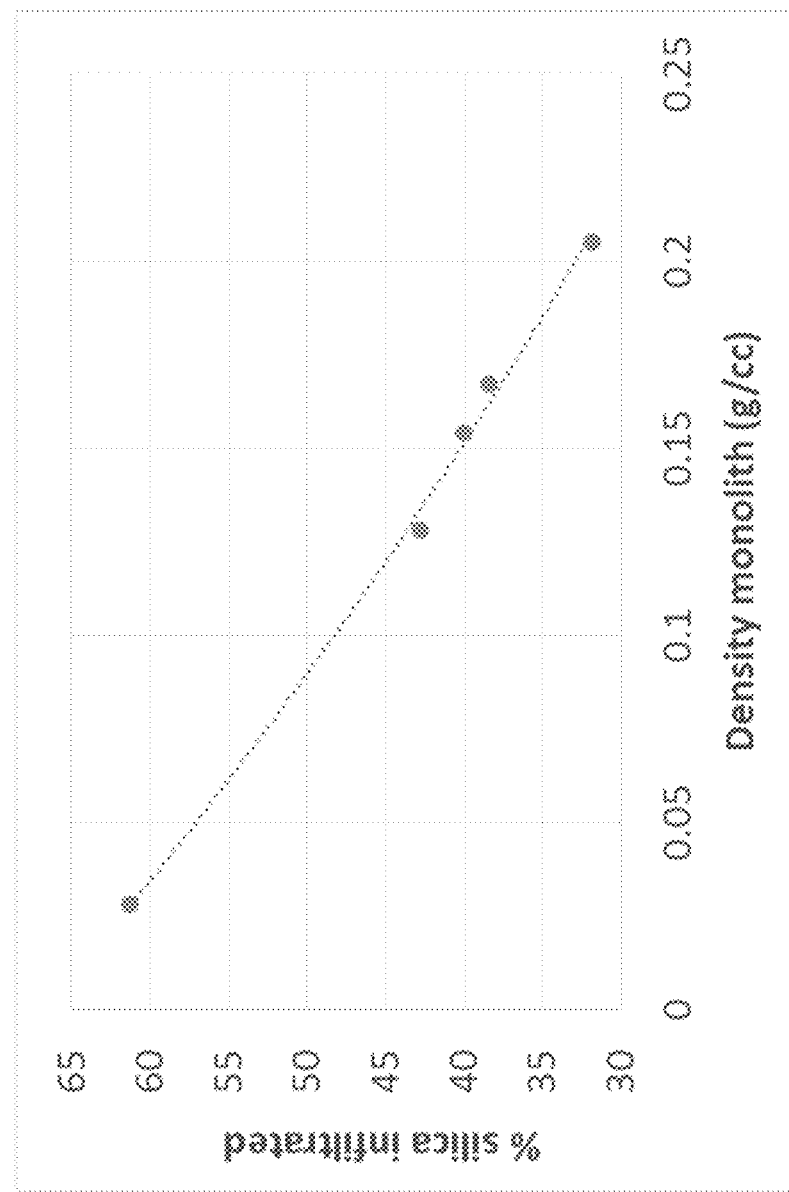
FIG. 5 is a plot of carbon aerogel density vs. silica content in % by weight for non-limiting embodiments of the disclosure.

For the carbon aerogels of Example 4, the weight of silica present was 50-55%, based on the total weight of the silica-impregnated carbon aerogel. For the carbon aerogels of Examples 2 and 3, the percent by weight of silica in the impregnated carbon aerogels increased with decreasing density of the carbon aerogel monoliths. Data for monolith density versus % silica is provided in FIG. 5.

Figure 6A:
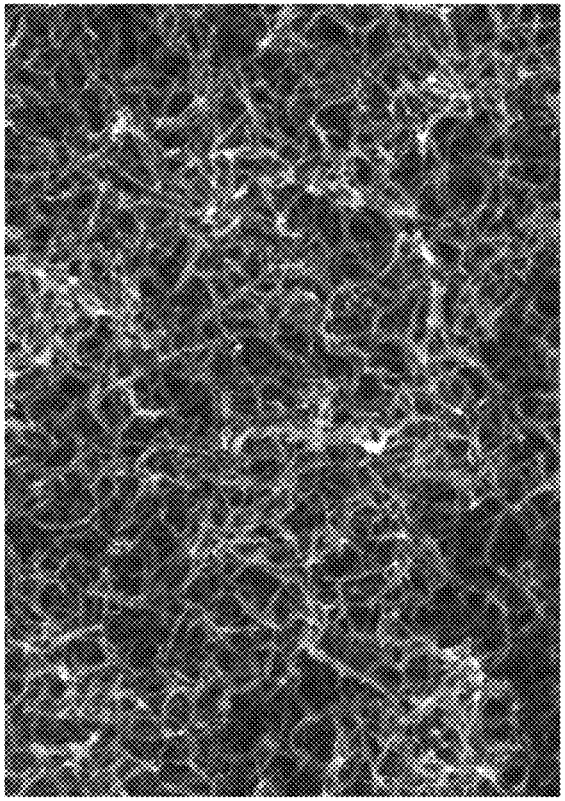
FIG. 6A is a high magnification (150,000×) scanning electron micrograph of a carbon aerogel monolith prior to contact with silica sol.
Figure 6B:
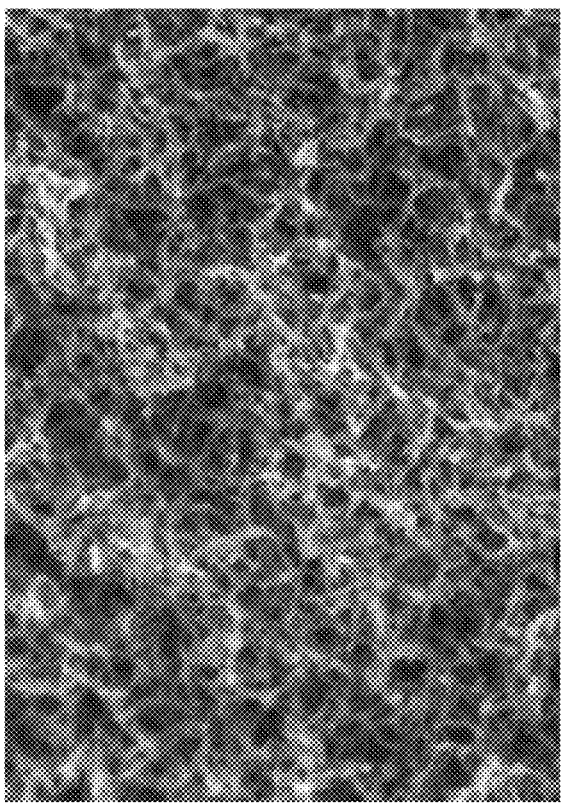
FIG. 6B is a high magnification (150,000×) scanning electron micrograph of a carbon aerogel monolith coated with silica according to a non-limiting embodiment of the disclosure.

The SEM images of the carbon monoliths before (FIG. 6A) and after infiltration with silica aerogel (FIG. 6B) showed that silica coats the carbon fibers, leaving at the same time interstitial spaces. These interstitial spaces are voids which may accommodate silicon expansion in, e.g., battery applications.

Figure 7:
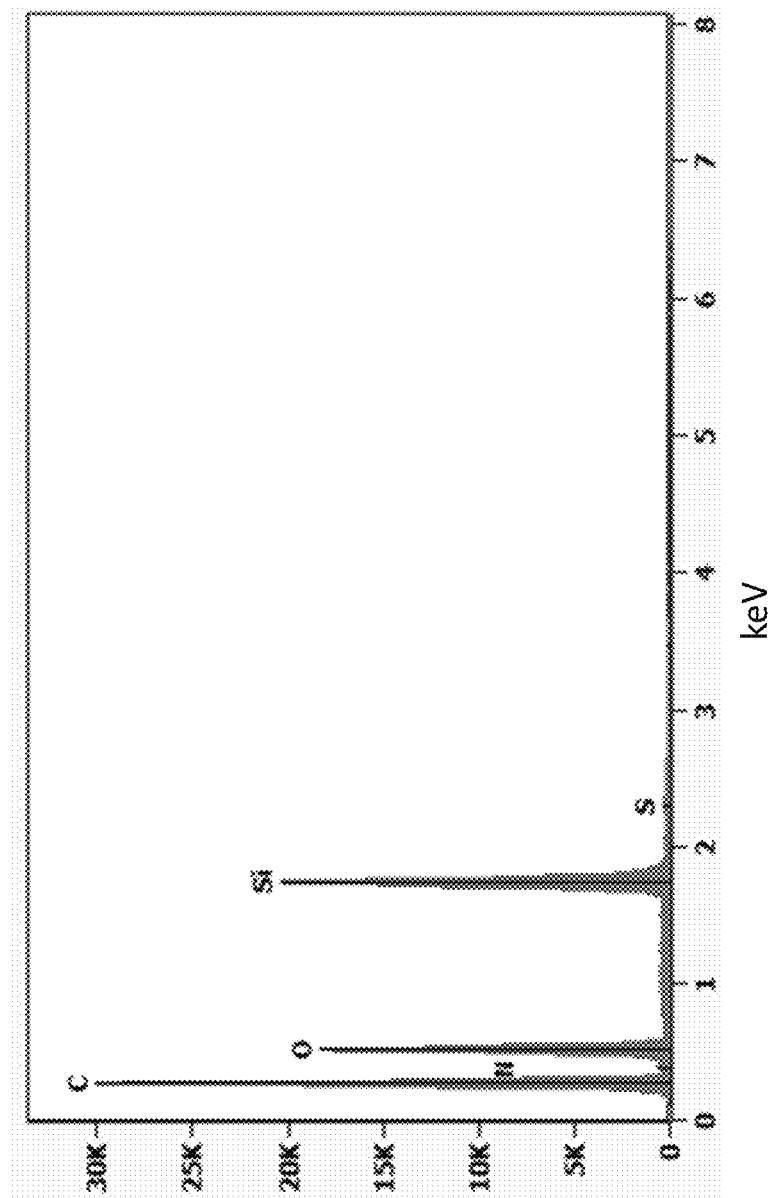
FIG. 7 is an electron-dispersive x-ray spectrogram (EDS) of a silica-coated carbon aerogel monolith according to a non-limiting embodiment of the disclosure.

A carbon-silica composite material of Example 4 containing 56% by weight silica showed an oxygen-to-silicon atomic ratio of 3, according to electron-dispersive x-ray spectroscopy (EDS) analysis (FIG. 7 and Table 2). The extra oxygen over the normal oxygen-to-silicon atomic ratio of 2 may be due to oxygen atoms present in the carbon aerogel.

TABLE 2

Atom % composition by EDS.

| Element | Normalized wt. % | Atom % |
|---|---|---|
| Carbon | 35.7 | 46.4 |
| Nitrogen | 3.1 | 3.4 |
| Oxygen | 38.7 | 37.7 |
| Silicon | 22.2 | 12.3 |
| Sulfur | 0.3 | 0.1 |
| Total | 100.0 | 100.0 |

Example 6. Magnesiothermic Reduction of a Silica Aerogel Powder

Figure 8:
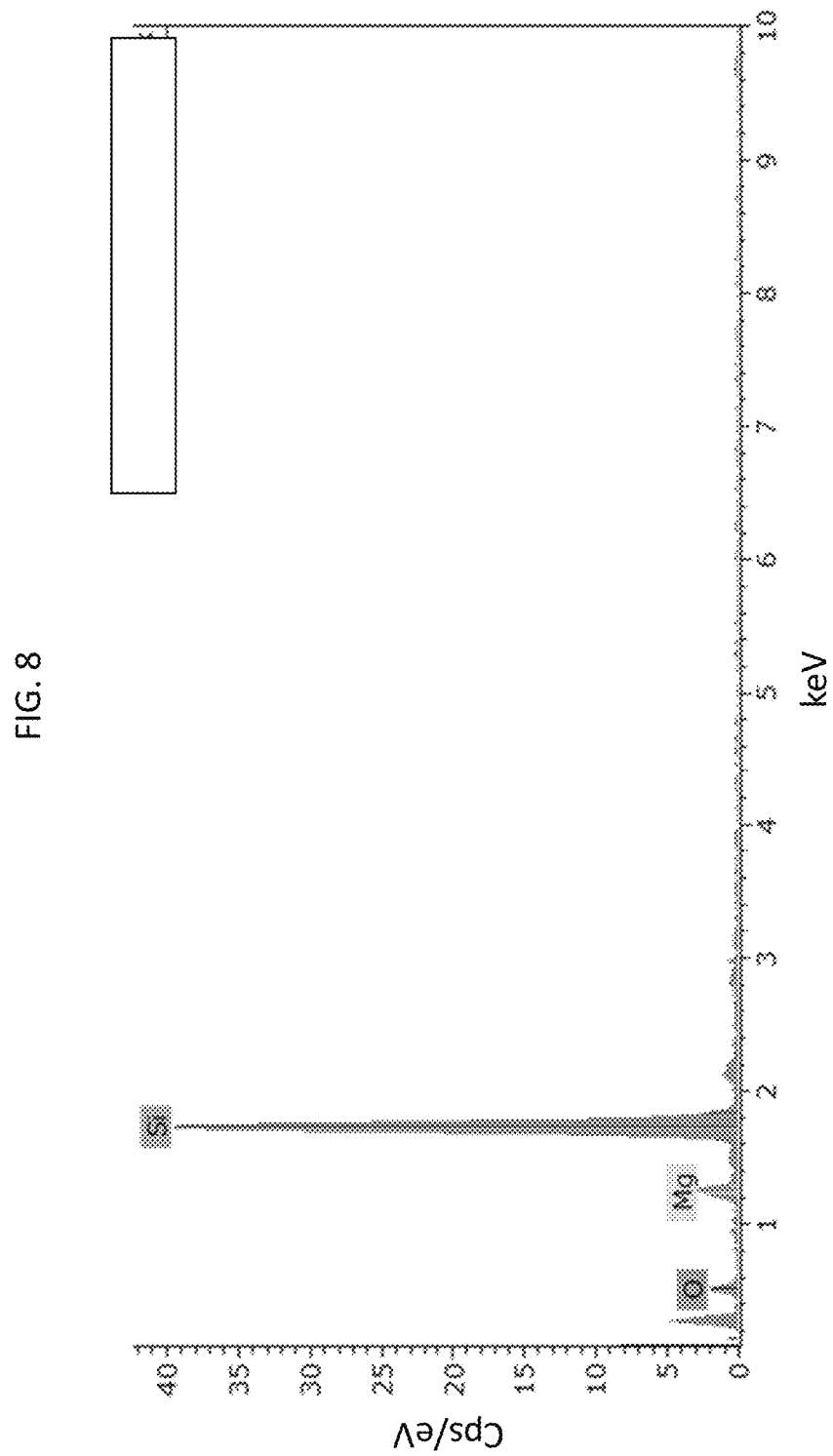
FIG. 8 is an EDS spectrum of a silicon aerogel prepared by metallothermic reduction of a silica aerogel monolith with magnesium according to a non-limiting embodiment of the disclosure.
Figure 9B:
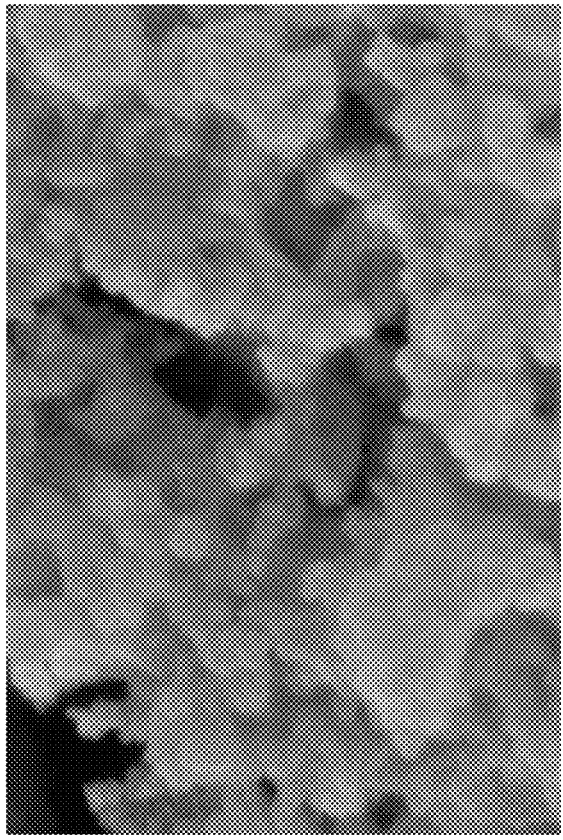
FIG. 9B is a higher magnification (350,000×) scanning electron micrograph of the silicon aerogel powder of FIG. 9A.
Figure 9A:
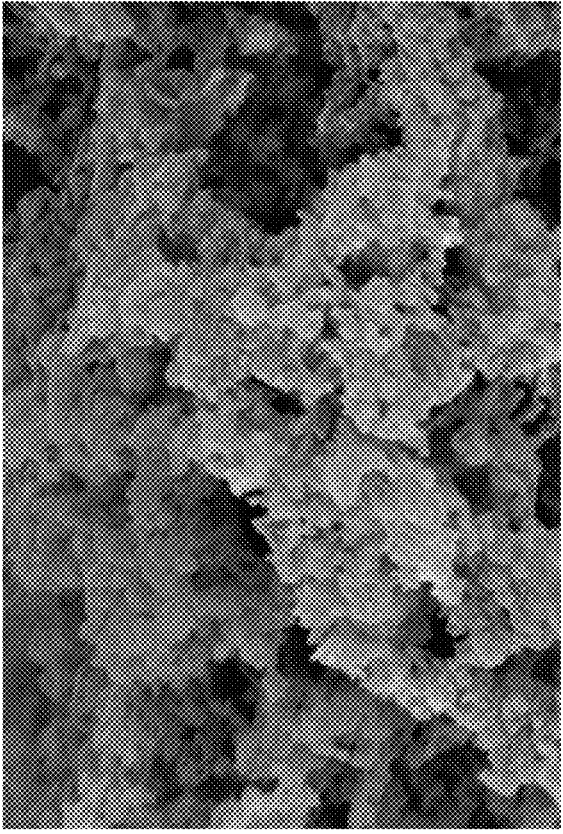
FIG. 9A is a high magnification (100,000×) scanning electron micrograph of a silicon aerogel powder prepared by metallothermic reduction of a silica aerogel monolith with magnesium according to a non-limiting embodiment of the disclosure.

In order to demonstrate the feasibility of metallothermic reduction of silica as an aerogel, magnesiothermic reduction of a silica aerogel material was performed. A silica aerogel monolith of bulk density 0.144 g/cm³ was prepared according to known procedures. The silica aerogel monolith was ground into a coarse powder and calcined at 500° C. for 3 hours to remove any residual organic groups introduced during the silica aerogel formation. Magnesium powder (0.45 g, particle size range of 0.3-300 μm) was mixed with 0.51 g of the calcined silica aerogel powder and the mixture pyrolyzed under nitrogen at 700° C. for 3 hours. The magnesiothermic reduction product was washed in 1M HCl for 4 hours to remove the magnesium by-products, rinsed three times with 40 mL water, then washed in acetone. After drying for 4 hours under vacuum, the resulting product had a weight of 0.25 g. EDS analysis (FIG. 8A) showed a significant reduction of the silica as determined by the oxygen-to-silicon ratio of 0.7 (FIG. 8; Table 3). Magnesium was present in an amount of about 4 atom % in the product. The magnesiothermic reduction of the silica aerogel led to porous silicon, isomorphic with the parent silica aerogel. The SEM images (FIGS. 9A and 9B) show the nanoporous nature of the silicon produced by this method, with distinctive nanocrystal growths.

TABLE 3

Atom % composition by EDS.

| Element | Normalized atom % |
| --- | --- |
| Silicon | 56.3 |
| Oxygen | 39.1 |
| Magnesium | 4.5 |

Example 7. Magnesiothermic Reduction of Silica Aerogel Beads

Figure 10:
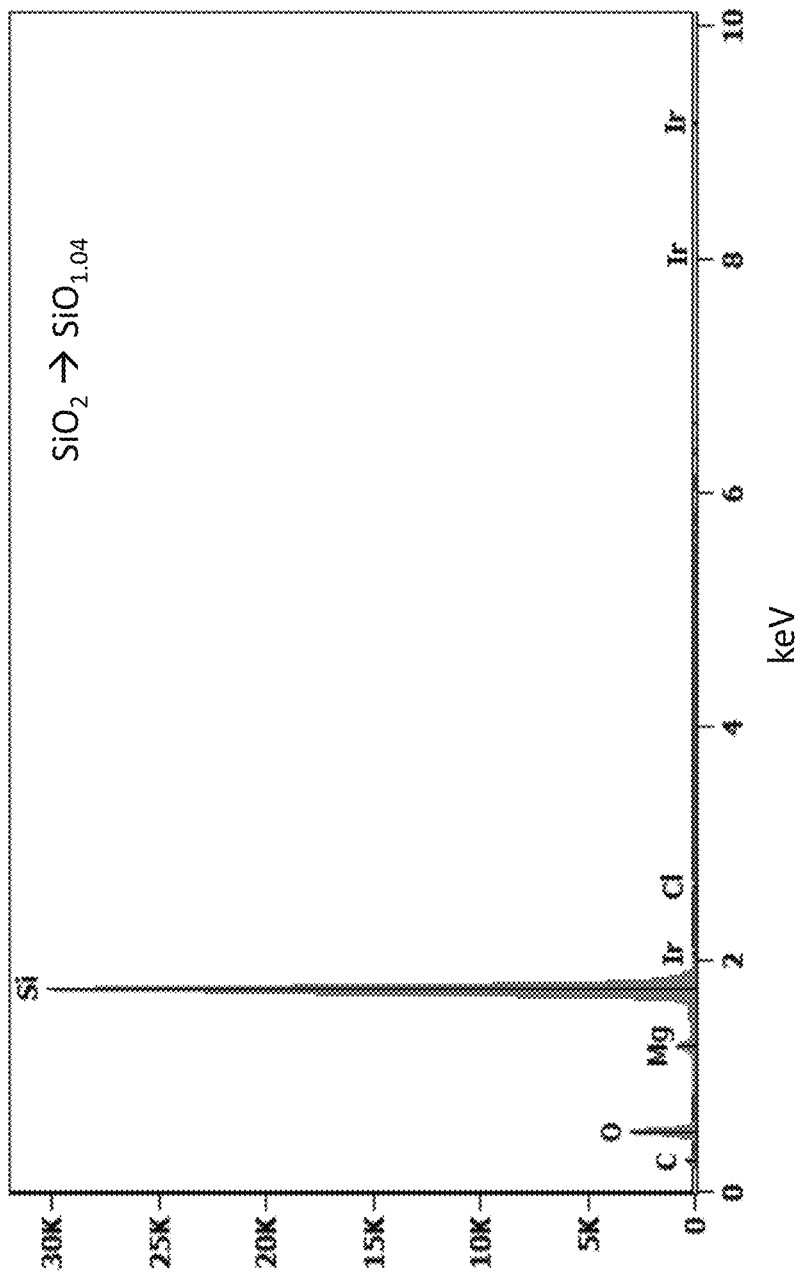
FIG. 10 is an EDS spectrum of a silicon aerogel powder prepared by metallothermic reduction of a silica aerogel bead with magnesium according to a non-limiting embodiment of the disclosure.
Figure 11:
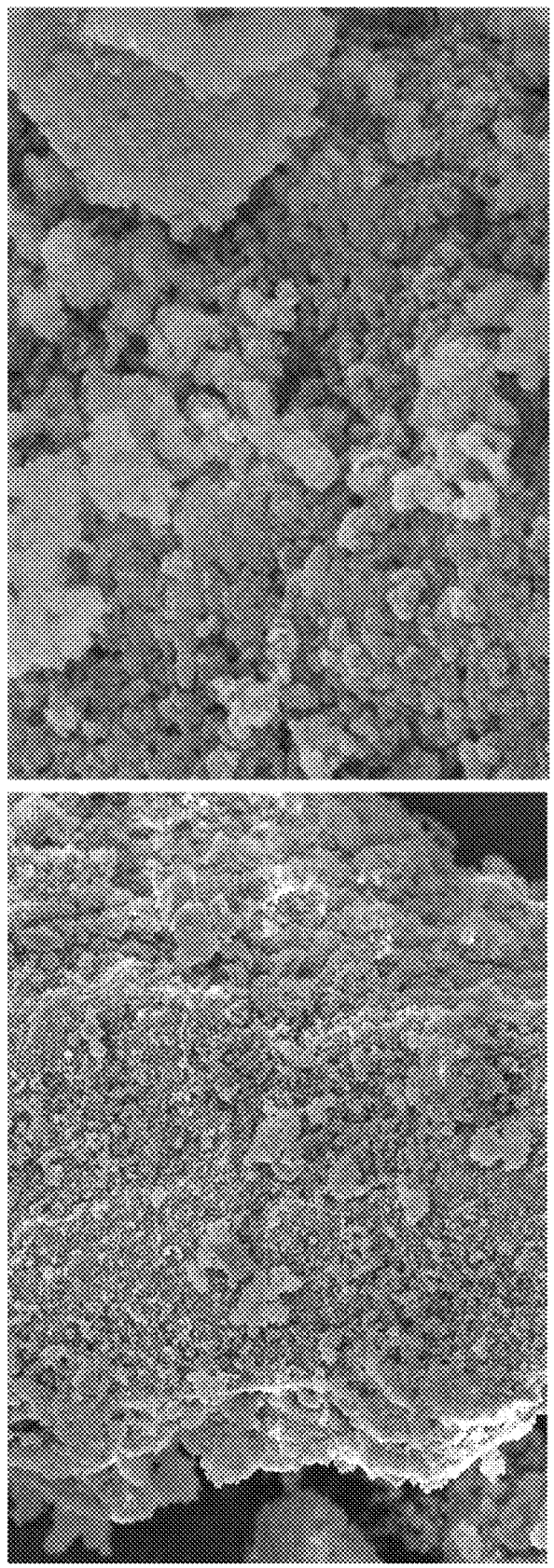
FIG. 11A is a high magnification (5,000×) scanning electron micrograph of a silicon aerogel powder prepared by metallothermic reduction of a silica aerogel bead with magnesium according to a non-limiting embodiment of the disclosure.
FIG. 11B is a higher magnification (50,000×) scanning electron micrograph of the silicon aerogel of FIG. 11A.

In order to demonstrate the feasibility of metallothermic reduction of silica aerogel in bead form, magnesiothermic reduction of a beaded silica aerogel material was performed. Silica aerogel beads were prepared according to known procedures. The silica aerogel beads were calcined at 500° C. for 3 hours to remove any residual organic groups introduced during the silica aerogel bead formation. The calcined beads (2.94 g, bulk density 0.119 g/cm³, and average size of about 800 microns) were mixed with Mg powder (2.47 g, particle size range of 0.3-300 μm) and heated under nitrogen at 650° C. for 12 hours. The pyrolyzed beads were washed with 400 mL of 1M HCl for 4 hours and rinsed three times with 250 mL water. A second purification step was performed using 50 mL of 6M HCl, followed by two water rinses and two hexane rinses. After drying for 4 hours under vacuum, the porous silicon had a weight of 1.78 g. EDS analysis (FIG. 10) showed a significant reduction of the silica to silicon (oxygen-to-silicon ratio of 1.04). Magnesium was present in an amount of about 1.1 atom % in the product (Table 4). SEM images of the silicon material is provided in two magnification levels (5 k and 50 k) in FIGS. 11A and 11B, respectively.

TABLE 4

Atom % composition by EDS.

| Element | Normalized wt. % | Atom % |
| --- | --- | --- |
| Carbon | 7.5 | 13.0 |
| Oxygen | 33.4 | 43.6 |
| Magnesium | 1.3 | 1.1 |
| Silicon | 56.2 | 41.8 |
| Chlorine | 0.4 | 0.2 |
| Iridium | 1.2 | 0.1 |
| Total | 100.0 | 100.0 |

Example 8. Impregnation of Carbon Aerogel Monoliths with Silica Sol

Figure 12:
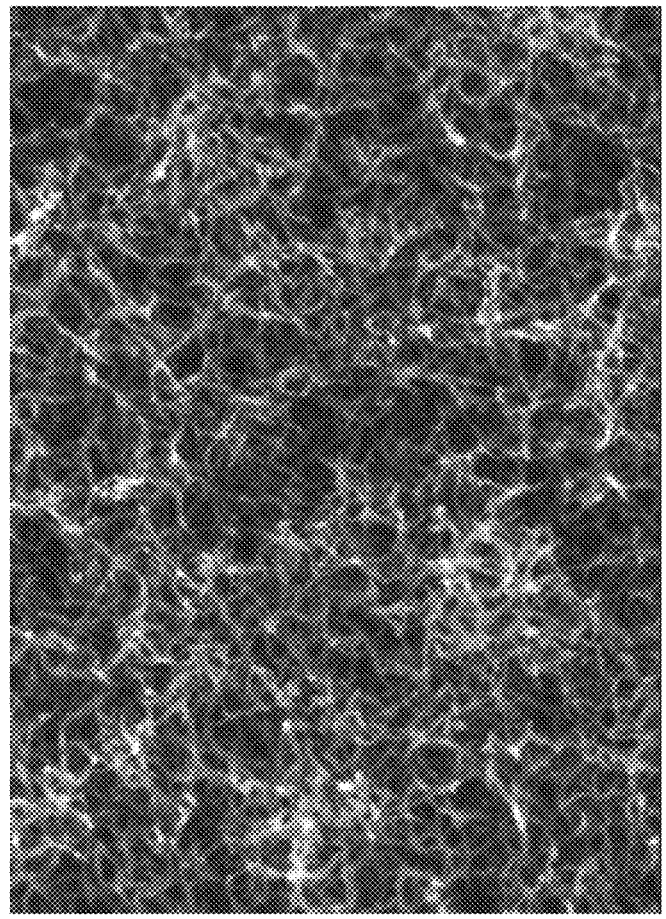
FIG. 12 is a high magnification (150,000×) scanning electron micrograph of a carbon aerogel monolith according to a non-limiting embodiment of the disclosure.

Polyimide wet-gels were prepared by an aqueous process. PDA (p-phenylenediamine, 1.66 g, 0.015 mol) was dissolved in 100 mL of water. Pyromellitic dianhydride (PMDA, 3.34 g, 0.015 mol) was added to the solution of PDA under vigorous stirring. Two hours later the container was occupied by a finely dispersed precipitate of the corresponding polyamic acid. The precipitate was dissolved by the slow addition of triethylamine to the mixture. Approximately 3.4-3.7 g of triethylamine (a 2.2-2.4 molar excess relative to either one of the monomers) was required in order to fully dissolve the precipitate. The resulting solution was stirred vigorously for another 12 h. At the end of this period, acetic anhydride (6.72 g, 0.066 mol) was added to the solution. The resulting mixture was stirred for about 1 min and then poured into cylindrical Teflon molds. The solution in the molds gelled after about 2 min from the original addition of acetic anhydride. The gels were aged for 24 h at room temperature and were demolded with the addition of ethanol. Subsequently, they were washed with ethanol 3 times, for 24 hours each time, and then dried with supercritical fluid $CO_2$ in an autoclave. The resulting polyimide aerogels were pyrolyzed to carbon aerogel monoliths at 1050° C. under nitrogen. A SEM image of the carbon aerogel monolith is provided in FIG. 12.

The resulting carbon aerogel monoliths were impregnated with a silica sol prepared from polydimethylsiloxane. To prepare the silica sol, a commercially available methanolic solution of polydimethylsiloxane (32 mL) was diluted with 28 mL of ethanol, and water (20 mL) was added. The resulting solution was stirred for 2-3 hours until it turned clear. The carbon aerogel monoliths were added to silica sol. Initially, the monoliths floated, but eventually sunk about 24 h later. The whole solution, with the carbon aerogel monoliths at the bottom of the container, gelled. The gel was allowed to dry partially by exposing it to the environment for 12 hours. The gelled silica sol cracked, and the silica gel impregnated carbon aerogel monoliths were readily mechanically separated from the rest of the gel. The impregnated monoliths were washed three times with ethanol at room temperature for 12 hours each time.

Figure 13A:
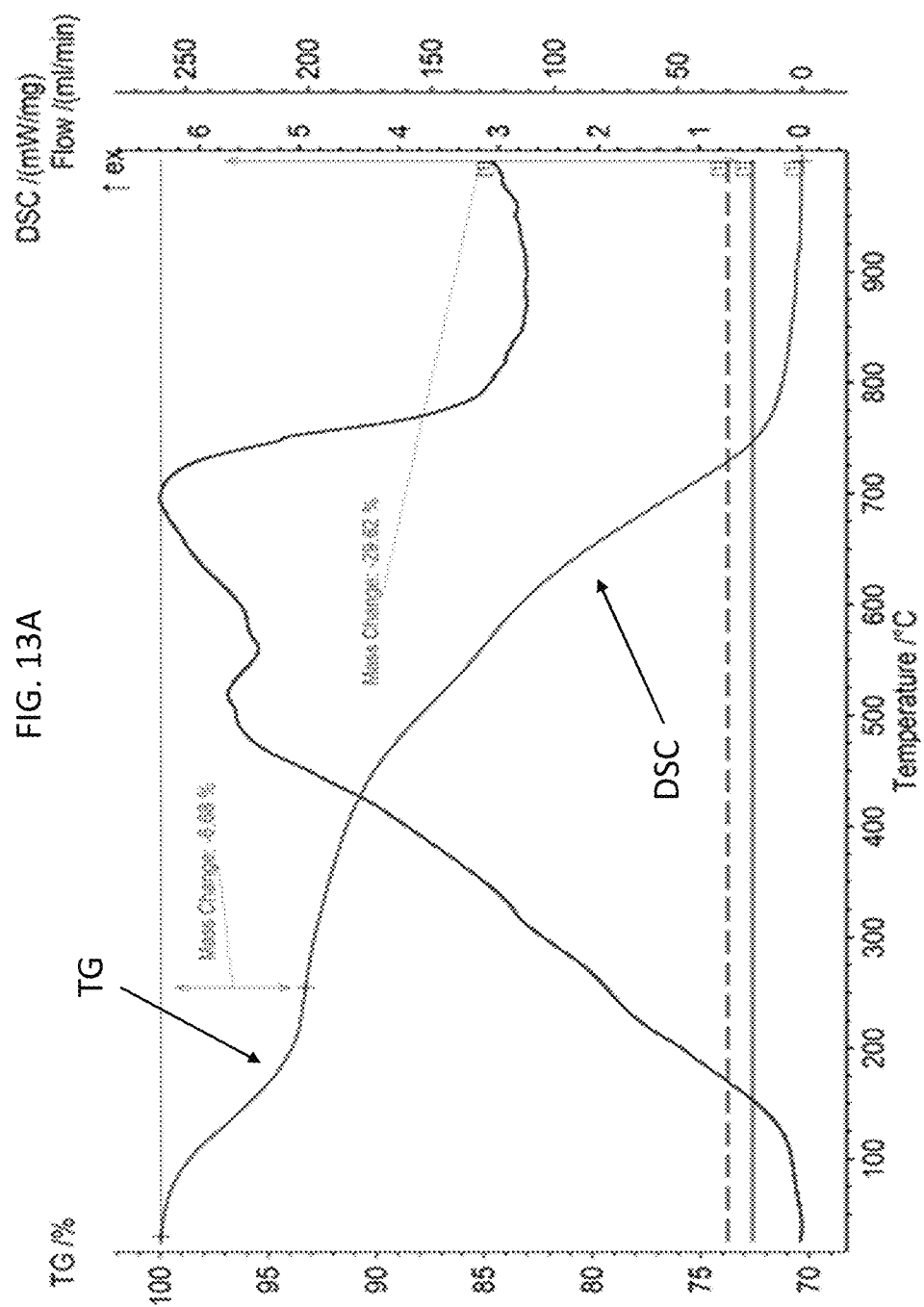
FIG. 13A is a scan of thermogravimetric analysis and differential scanning calorimetry (DSC) of a silica-impregnated carbon aerogel according to a non-limiting embodiment of the disclosure.
Figure 13B:
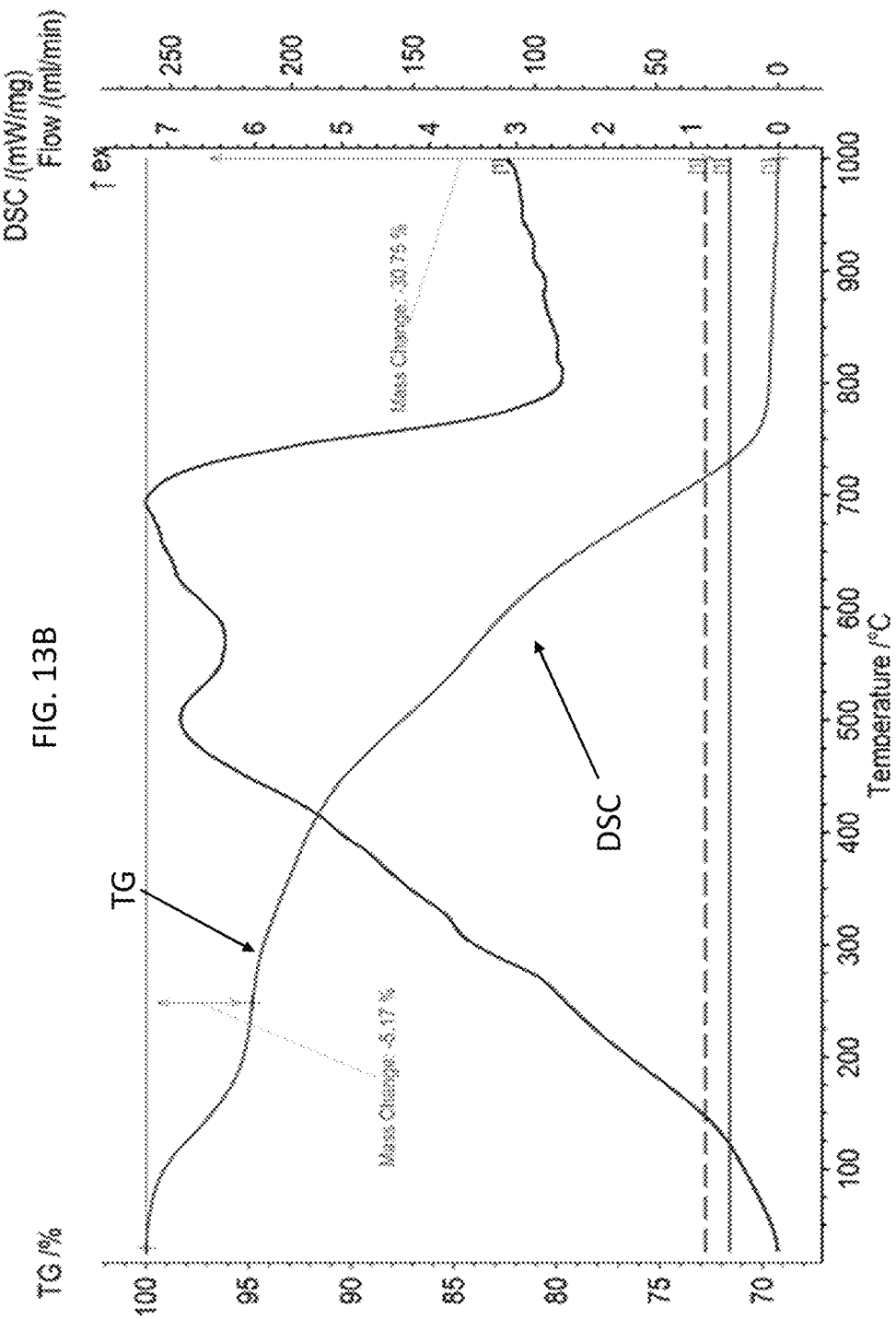
FIG. 13B is a scan of thermogravimetric analysis and differential scanning calorimetry (DSC) of a silica-impregnated carbon aerogel according to a non-limiting embodiment of the disclosure.
Figure 14B:
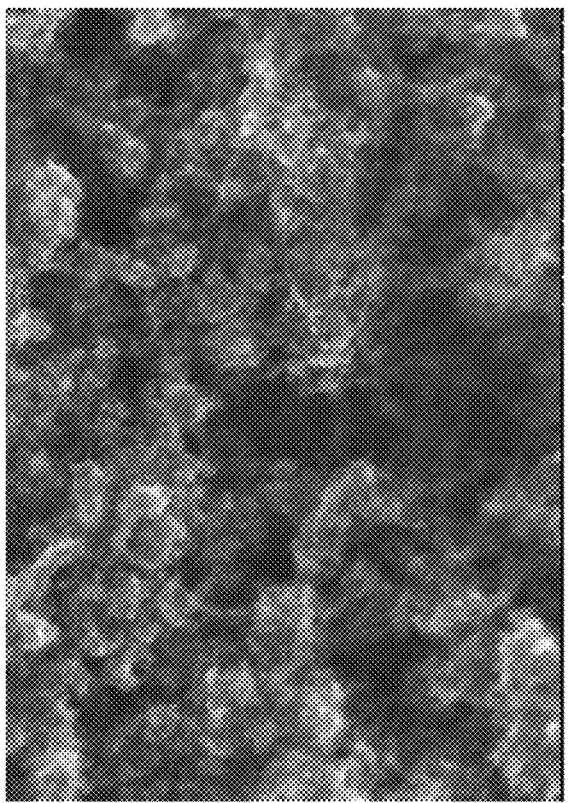
FIG. 14B is a high magnification (150,000×) SEM image of silica inside the pores of a carbon aerogel according to a non-limiting embodiment of the disclosure.
Figure 14A:
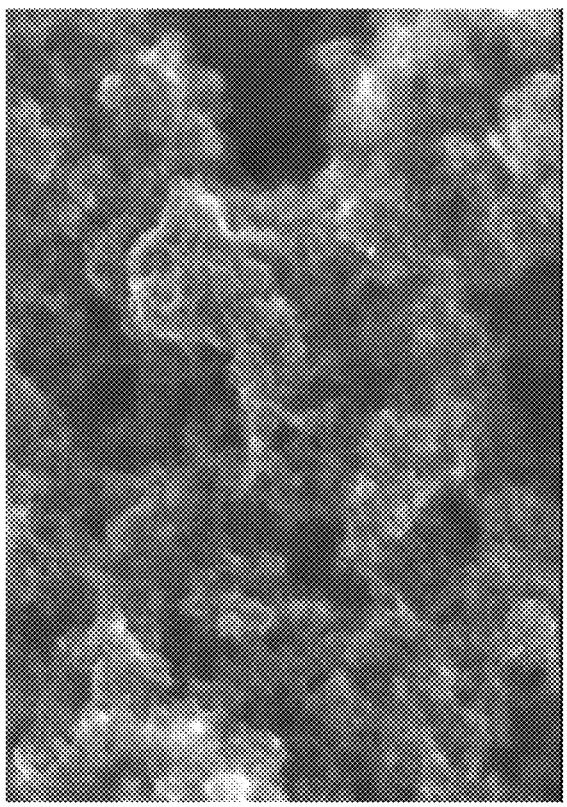
FIG. 14A is a high magnification (150,000×) SEM image of silica inside the pores of a carbon aerogel according to a non-limiting embodiment of the disclosure.
Figure 15:
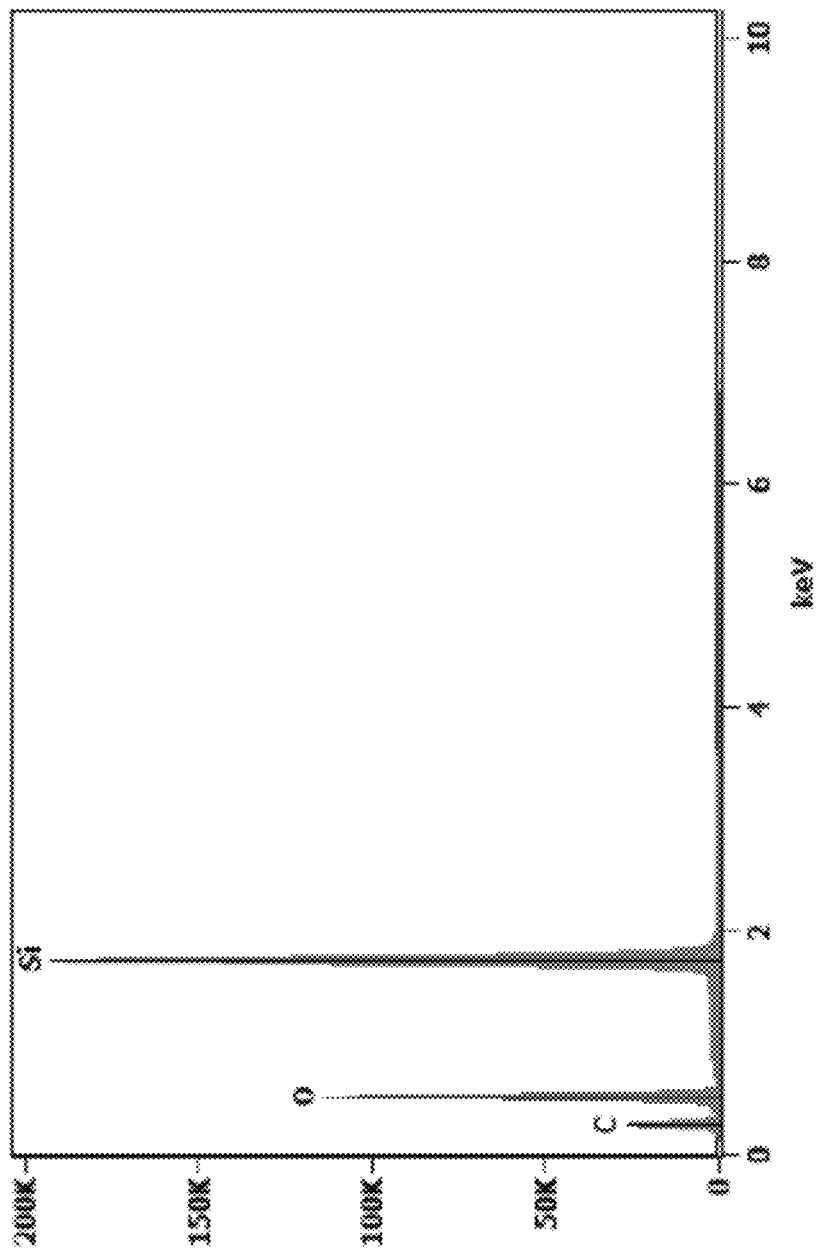
FIG. 15 is an EDS spectrum of a carbon aerogel impregnated with silica xerogel according to a non-limiting embodiment of the disclosure.

Half of the ethanol-washed, silica gel-infiltrated carbon aerogel monoliths were allowed to dry in the open air, turning the silica gel inside the pores of the carbon aerogel into a xerogel (Example 8A). The other half of the ethanol-washed, silica gel-infiltrated carbon aerogel monoliths was dried with supercritical fluid $CO_2$, turning the silica gel inside the pores of the carbon aerogel into an aerogel (Example 8B). Thermogravimetric analysis and differential scanning calorimetry (DSC) showed that both materials (Examples 8A and 8B) consisted of about 70% w/w of silica (FIGS. 13A and 13B, respectively). SEM images of Examples 8A and 8B (FIGS. 14A and 14B, respectively) showed that in both cases, silica formed conformal coatings on the skeletal carbon fibers. The two impregnated materials appeared very similar in morphology. Without wishing to be bound by theory, it is believed that the structure of the silica coating is driven by the affinity of silica for the surface of carbon, rather than the further processing of the silica gel following an ambient-pressure, xerogel-like drying protocol, or a supercritical fluid, aerogel-like drying protocol. EDS analysis (FIG. 15) of the silica xerogel-impregnated carbon aerogel (Example 8A) confirmed the presence of silica.

| Element | Normalized wt. % | Atom % |
|---|---|---|
| Carbon | 15.2 | 22.2 |
| Oxygen | 53.2 | 58.2 |
| Silicon | 31.5 | 19.6 |
| Total | 100.0 | 100.0 |

Figure 16:
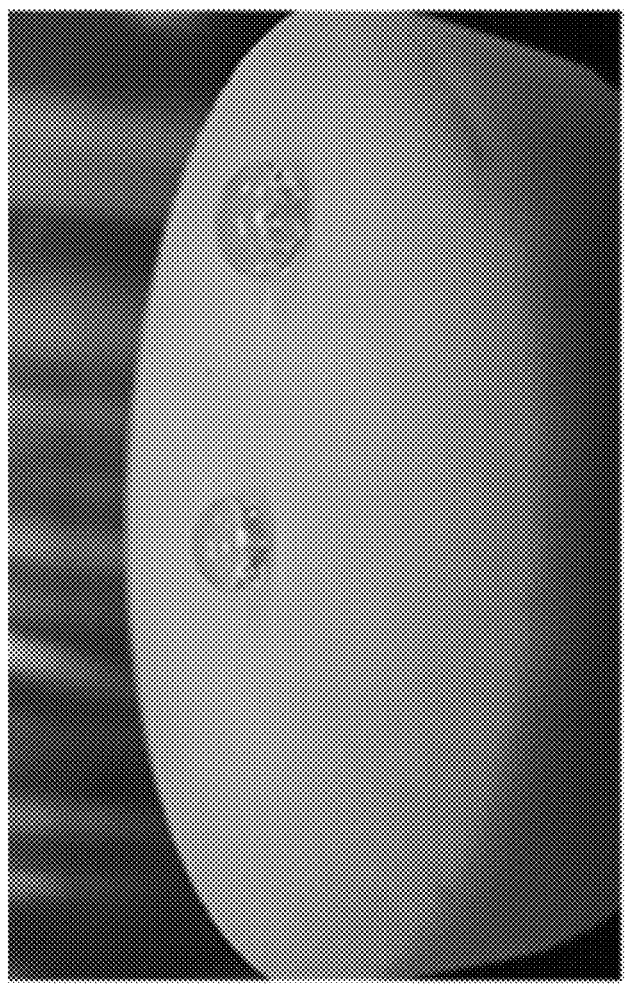
FIG. 16 is a photograph of translucent hybrid gels according to a non-limiting embodiment of the disclosure.
Figure 17A:
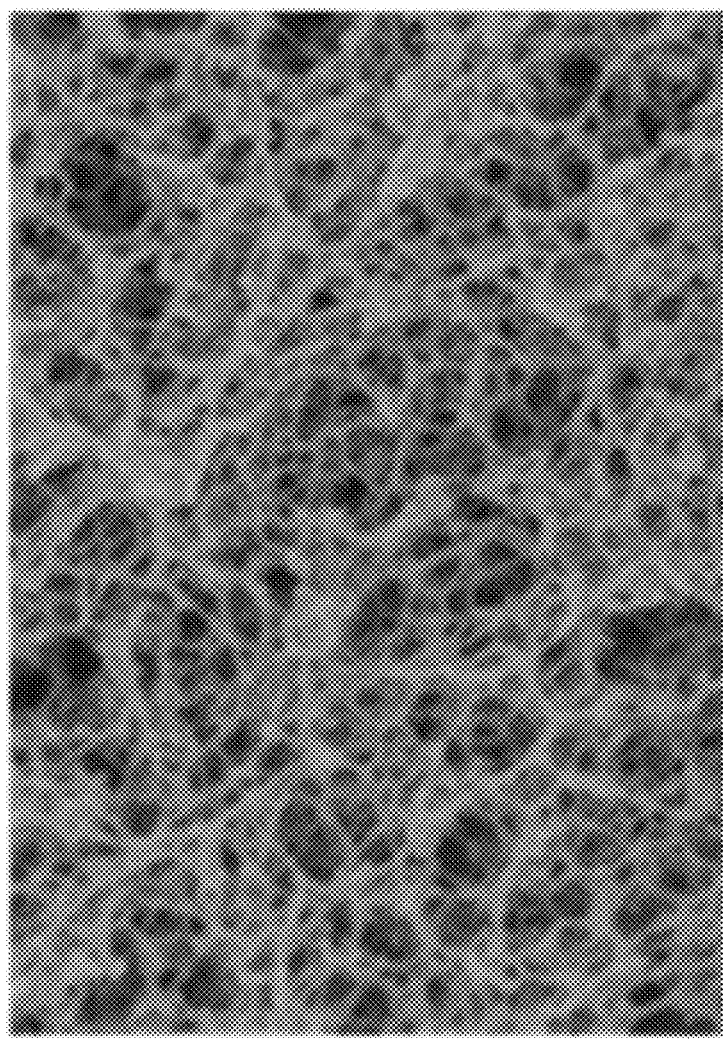
FIG. 17A is a high magnification (100,000×) SEM image of a silica-polyimide hybrid aerogel according to a non-limiting embodiment of the disclosure.
Figure 17B:
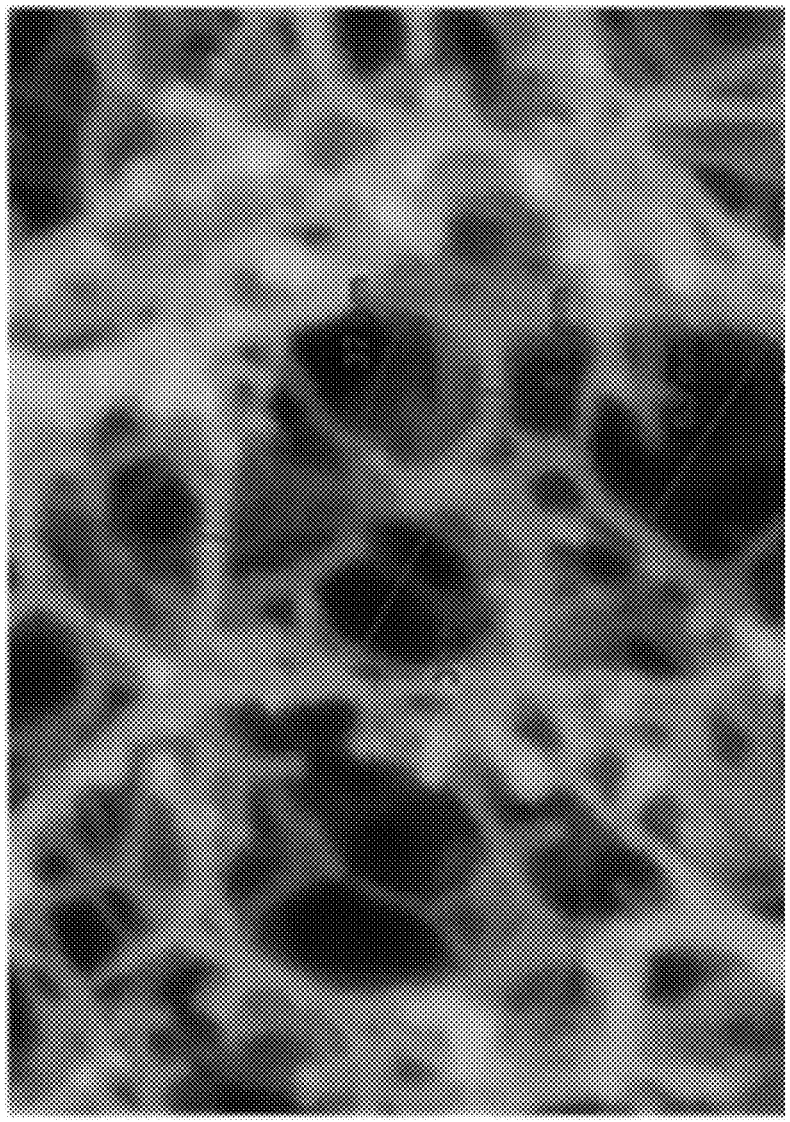
FIG. 17B is a high magnification (400,000×) SEM image of a silica-polyimide hybrid aerogel according to a non-limiting embodiment of the disclosure.

Example 9. Preparation of Hybrid Carbon-Silica Aerogel Monolith by Co-Mixing Silica and Polyimide Sols Hybrid polyimide-silica aerogels were prepared by co-mixing and co-gelling polyimide and silica sols. The polyimide and silica sols were prepared separately. For the polyimide sol, pPyromellitic dianhydride (PMDA, 5 g, 0.022 mol) was dissolved in 100 mL of dimethylacetamide (DMAC). Once dissolved, the solution was mixed for 30 minutes, then p-phenylenediamine (PDA; 2.5 g, 0.022 mol) was added to the solution of PMDA under vigorous stirring. After two hours, acetic anhydride (9.67 g, 0.095 mol) was added to the resulting polyamic solution to imidize (i.e., dehydrate the polyamic acid sol). After one hour under vigorous mixing, 20 ml of pre-hydrolyzed silica sol, containing 28% by weight of silica, was added to the polyimide sol. The pre-hydrolyzed silica sol was obtained by hydrolyzing methyltriethoxysilane (MTES) with water ($H_2O$/MTES ratio of 3), in ethanol containing acid. The ratio of polyimide/$SiO_2$ by weight was about 1.34. The resulting hybrid sol was stirred for another 1 hr. The gelation of the resulting hybrid sol was activated by addition of pyridine. Pyridine (4.17 g, 0.053 mol) was added to the final hybrid sol, and the solution mixed for 5-10 minutes, then poured into cylindrical Teflon molds. The solution in the molds gelled after about 45 min from the original addition of pyridine to provide translucent hybrid gels (FIG. 16). The gelation time can be shortened by increasing the amount of pyridine. The gels were aged for 24 h at room temperature and demolded with the addition of ethanol. Subsequently, they were washed with ethanol 3 times, 24 hours each, and then dried with supercritical fluid $CO_2$ in an autoclave. Scanning electron microscopic images of the hybrid aerogels at two magnifications is provided in FIGS. 17A and 17B (100,000× and 400,000×, respectively).

Figure 18A:
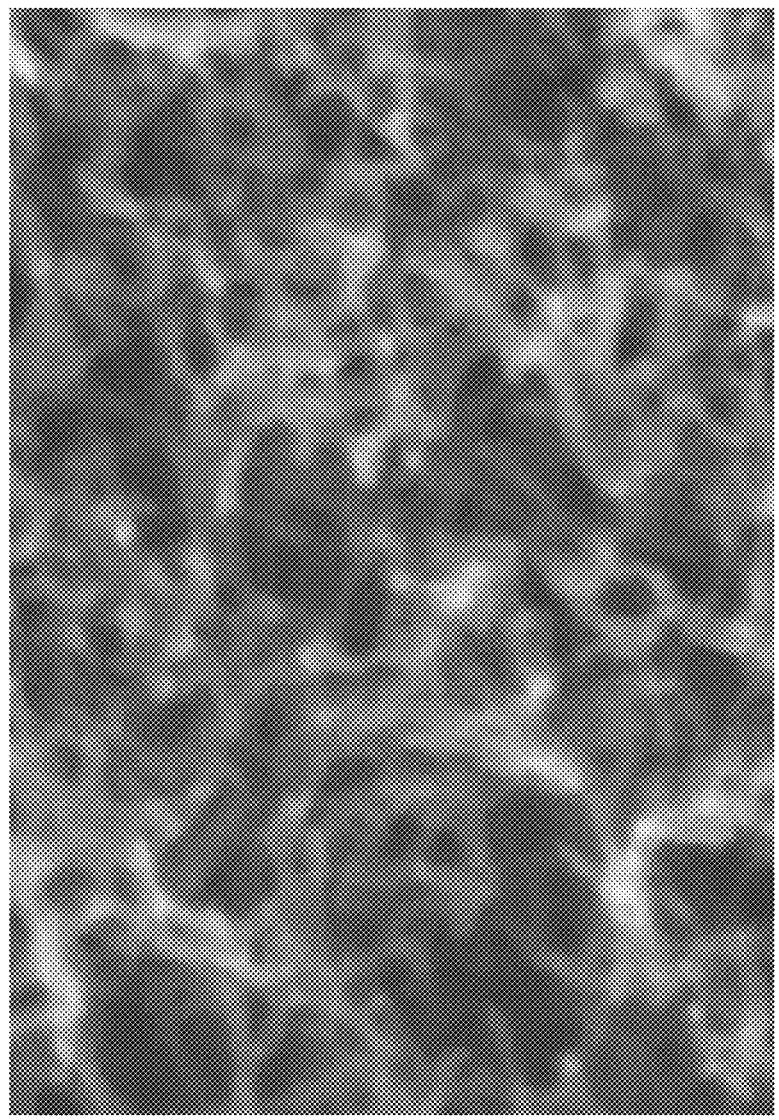
FIG. 18A is a high magnification (400,000×) SEM image of a silica-carbon hybrid aerogel according to a non-limiting embodiment of the disclosure.
Figure 18B:
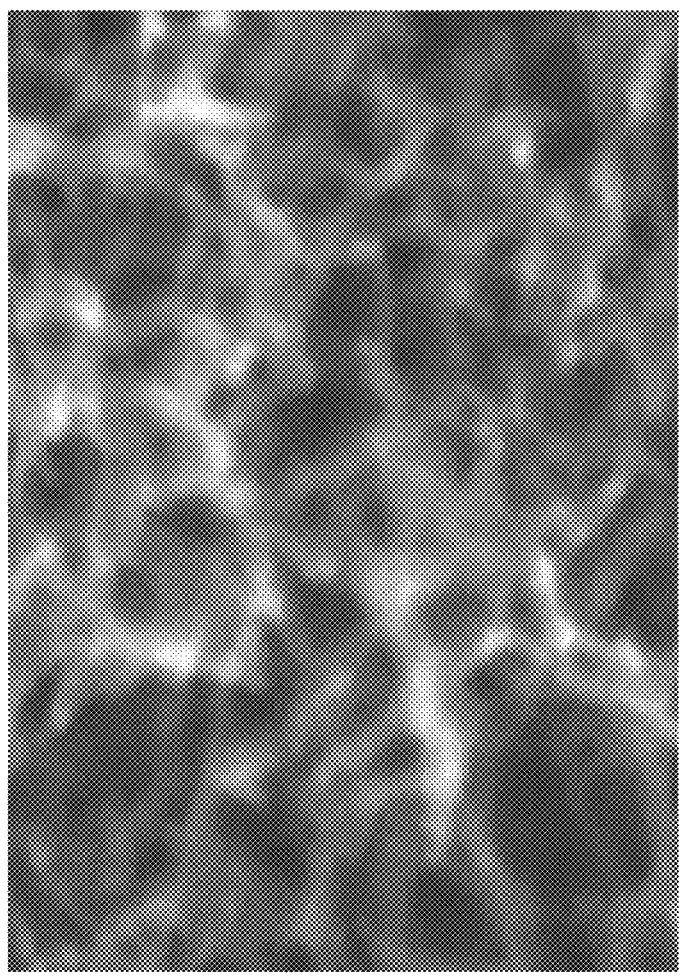
FIG. 18B is a high magnification (600,000×) SEM image of a silica-carbon hybrid aerogel according to a non-limiting embodiment of the disclosure.

The hybrid aerogel monoliths were subsequently carbonized at 1050° C. for 2 hours under nitrogen gas to provide the corresponding carbon-silica aerogels. Scanning electron microscopic images of the carbonized aerogels are provided in FIGS. 18A and 18B, at two magnifications (400,000× and 600,000×), the latter clearly showing silica coated on the carbon fiber structure.

Example 10. Preparation of Hybrid Carbon-Silica Aerogel Monolith by Co-Mixing Silica and Polyimide Sols Hybrid polyimide-silica aerogels were prepared as in Example 9, but at a higher polyimide to silica weight ratio in the hybrid sol (ratio by weight of about 2.2). The gelation time was reduced to about 30 minutes with this higher ratio. The wet gels were aged, washed, dried, and carbonized as in Example 9 to provide the corresponding carbon-silica aerogels.

What is claimed is:

1. A method of preparing a silica-carbon composite material comprising a carbon material of low bulk density, the carbon material comprising a skeletal framework comprising carbon nanofibers, the skeletal framework forming a pore structure comprising an array of interconnected pores, the silica-carbon composite material further comprising a conformal coating layer of amorphous silica on the carbon nanofibers, the method comprising:
   providing a fibrous polyimide aerogel;
   impregnating the fibrous polyimide aerogel with a silica sol;
   allowing the silica sol to gel, spontaneously forming the conformal coating layer of amorphous silica on the fibrous polyimide aerogel;
   drying the silica coated fibrous polyimide aerogel under ambient or supercritical conditions to form a silica aerogel coating layer on the polyimide aerogel fibers; and
   pyrolyzing the silica aerogel coated fibrous polyimide aerogel to form the silica-carbon composite material.

2. The method of claim 1, wherein the silica sol comprises tetraethyl orthosilicate, tetramethyl orthosilicate, sodium silicate, pre-hydrolyzed pre-polymers of ethyl polysilicate, methyl polysilicate, methyl triethoxysilane, polydimethylsiloxane, or combinations thereof.

3. The method of claim 1, wherein the silica sol comprises tetraethyl orthosilicate, tetramethyl orthosilicate, polydimethylsiloxane, or a combination thereof.

4. The method of claim 1, wherein the silica-carbon composite material comprises silica in an amount by weight from about 30 to about 80%, or from about 40 to about 70%.

5. The method of claim 1, wherein the conformal coating layer of amorphous silica has a thickness from about 1 to about 20 nm.

6. The method of claim 1, wherein the silica-carbon composite material is in monolithic form, in a form of thin sheets, or in a form of particles.

7. The method of claim 1, wherein the silica-carbon composite material is in the form of particles.

8. The method of claim 7, wherein the particles are spherical, having a diameter from about 100 nm to about 4 mm, or from about 5 µm to about 4 mm.

9. The method of claim 1, wherein the silica of the silica aerogel coating layer is amorphous.

10. The method of claim 1, further comprising metallothermically reducing at least a portion of the silica of the silica aerogel coating layer present in the silica-carbon composite material, forming a silicon-carbon composite material.

11. The method of claim 10, wherein metallothermically reducing comprises contacting the silica-carbon composite material with a metallic reducing agent at an elevated temperature and under an inert atmosphere for a period of time sufficient to reduce a substantial portion of the silica to silicon.

12. The method of claim 11, wherein the metallic reducing agent comprises magnesium, calcium, combinations thereof, or alloys thereof.

13. The method of claim 11, wherein the metallic reducing agent is magnesium.

14. The method of claim 13, wherein the magnesium is in bulk form, in a form of turnings, or in particulate form.

15. The method of claim 13, wherein the magnesium is in particulate form having a particle size from about 0.3 to about 300 micrometers.

16. The method of claim 11, wherein the elevated temperature is from about 450 to about 900° C.

17. The method of claim 11, further comprising washing the silicon-carbon composite material with an acid.

18. The method of claim 17, wherein the acid is a solution of hydrochloric acid, phosphoric acid, hydrofluoric acid, or combinations thereof.

19. A silicon-carbon composite material prepared by the method of claim 10.

\* \* \* \* \*